(12) United States Patent
Kajikawa et al.

(10) Patent No.: US 12,424,898 B2
(45) Date of Patent: Sep. 23, 2025

(54) ROTATING ELECTRICAL MACHINE AND DRIVE DEVICE

(71) Applicant: NIDEC CORPORATION, Kyoto (JP)

(72) Inventors: Satoshi Kajikawa, Kyoto (JP); Hibiki Takada, Kyoto (JP); Takahiro Sonoda, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 175 days.

(21) Appl. No.: 18/547,701

(22) PCT Filed: Jun. 11, 2021

(86) PCT No.: PCT/JP2021/022348
§ 371 (c)(1),
(2) Date: Aug. 24, 2023

(87) PCT Pub. No.: WO2022/180874
PCT Pub. Date: Sep. 1, 2022

(65) Prior Publication Data
US 2024/0305159 A1 Sep. 12, 2024

(30) Foreign Application Priority Data
Feb. 26, 2021 (JP) ................. 2021-029589

(51) Int. Cl.
*H02K 5/20* (2006.01)
(52) U.S. Cl.
CPC ................... *H02K 5/203* (2021.01)
(58) Field of Classification Search
CPC ............. H02K 5/20; H02K 5/203; H02K 9/19
See application file for complete search history.

(56) References Cited

U.S. PATENT DOCUMENTS 10,404,131 B2 9/2019 Sawada et al.
2003/0222519 A1* 12/2003 Bostwick ............... H02K 5/203
310/58

(Continued)

FOREIGN PATENT DOCUMENTS

JP H05088185 U 11/1993
JP 2015019494 A 1/2015

(Continued)

OTHER PUBLICATIONS

International Search Report in PCT/JP2021/022348, mailed Aug. 17, 2021. 4pp.

*Primary Examiner* — Oluseye Iwarere
*Assistant Examiner* — Masoud Vaziri
(74) *Attorney, Agent, or Firm* — HAUPTMAN HAM, LLP

(57) ABSTRACT

A housing of a rotating electrical machine has a flow path extending in a rectangular wave shape along a circumferential direction, and including axial paths, and first and second circumferential paths joining first ends and second ends of the axial paths, respectively. The axial path includes joined first and second paths. A cross-section in each of the first and second paths decreases toward the other. A difference between the cross-sections at the first end and at the first circumferential path is not higher than a difference between the cross-sections at the first end and at a third end of the first path close to the second path. A difference between the cross-sections at the second end and at the second circumferential path is not higher than a difference between the cross-sections at the second end and at a fourth end of the second path close to the first path.

8 Claims, 11 Drawing Sheets

(56) References Cited

U.S. PATENT DOCUMENTS

2017/0047809 A1* 2/2017 Sawada ................. H02K 5/203
2022/0209625 A1* 6/2022 Takamura ............... H02K 9/19

FOREIGN PATENT DOCUMENTS

JP          2020162187 A     10/2020
WO     2009015946 A1    2/2009

* cited by examiner

ROTATING ELECTRICAL MACHINE AND DRIVE DEVICE

CROSS-REFERENCE TO RELATED APPLICATIONS

This is the U.S. national stage of application No. PCT/JP2021/022348, filed on Jun. 11, 2021, and priority under 35 U.S.C. § 119 (a) and 35 U.S.C. § 365 (b) is claimed from Japanese Patent Application No. 2021-029589, filed on Feb. 26, 2021.

FIELD OF THE INVENTION

The present invention relates to a rotating electrical machine and a drive device.

BACKGROUND

For example, a rotating machine provided with a water flow path that leads in an axial direction and is reversed at an axial end has been known.

In the rotating machine as described above, it has been required to further improve the cooling efficiency by the water flow path.

SUMMARY

One aspect of an exemplary rotating electrical machine of the present invention includes: a rotor rotatable about a central axis; a stator facing the rotor across a gap; and a housing internally accommodating the rotor and the stator. The housing has a flow path extending in a rectangular wave shape along z circumferential direction. The flow path includes a plurality of axial flow path portions extending in an axial direction and arranged at intervals in the circumferential direction, a first circumferential flow path portion joining first end parts on an axial one side of the axial flow path portions circumferentially adjacent to each other, and a second circumferential flow path portion joining second end parts on an axial other side of the axial flow path portions circumferentially adjacent to each other. The axial flow path portion includes a first flow path portion having the first end part, and a second flow path portion having the second end part and joined to an axial other side of the first flow path portion. A flow path cross-sectional area in the first flow path portion decreases toward the second flow path portion. A flow path cross-sectional area in the second flow path portion decreases toward the first flow path portion. A difference between a flow path cross-sectional area at the first end part and a flow path cross-sectional area at the first circumferential flow path portion is equal to or less than a difference between the flow path cross-sectional area at the first end part and a flow path cross-sectional area at a third end part of the first flow path portion, the third end part being on a side close to the second flow path portion. A difference between a flow path cross-sectional area at the second end part and a flow path cross-sectional area at the second circumferential flow path portion is equal to or less than a difference between the flow path cross-sectional area at the second end part and a flow path cross-sectional area at a fourth end part of the second flow path portion, the fourth end part being on a side close to the first flow path portion.

One aspect of an exemplary drive device of the present invention is a drive device mounted on a vehicle, the drive device including: the rotating electrical machine described above; and a transmission mechanism connected to the rotor and transmitting rotation of the rotor to an axle of the vehicle.

The above and other elements, features, steps, characteristics and advantages of the present disclosure will become more apparent from the following detailed description of the preferred embodiments with reference to the attached drawings.

DETAILED DESCRIPTION

Figure 1:
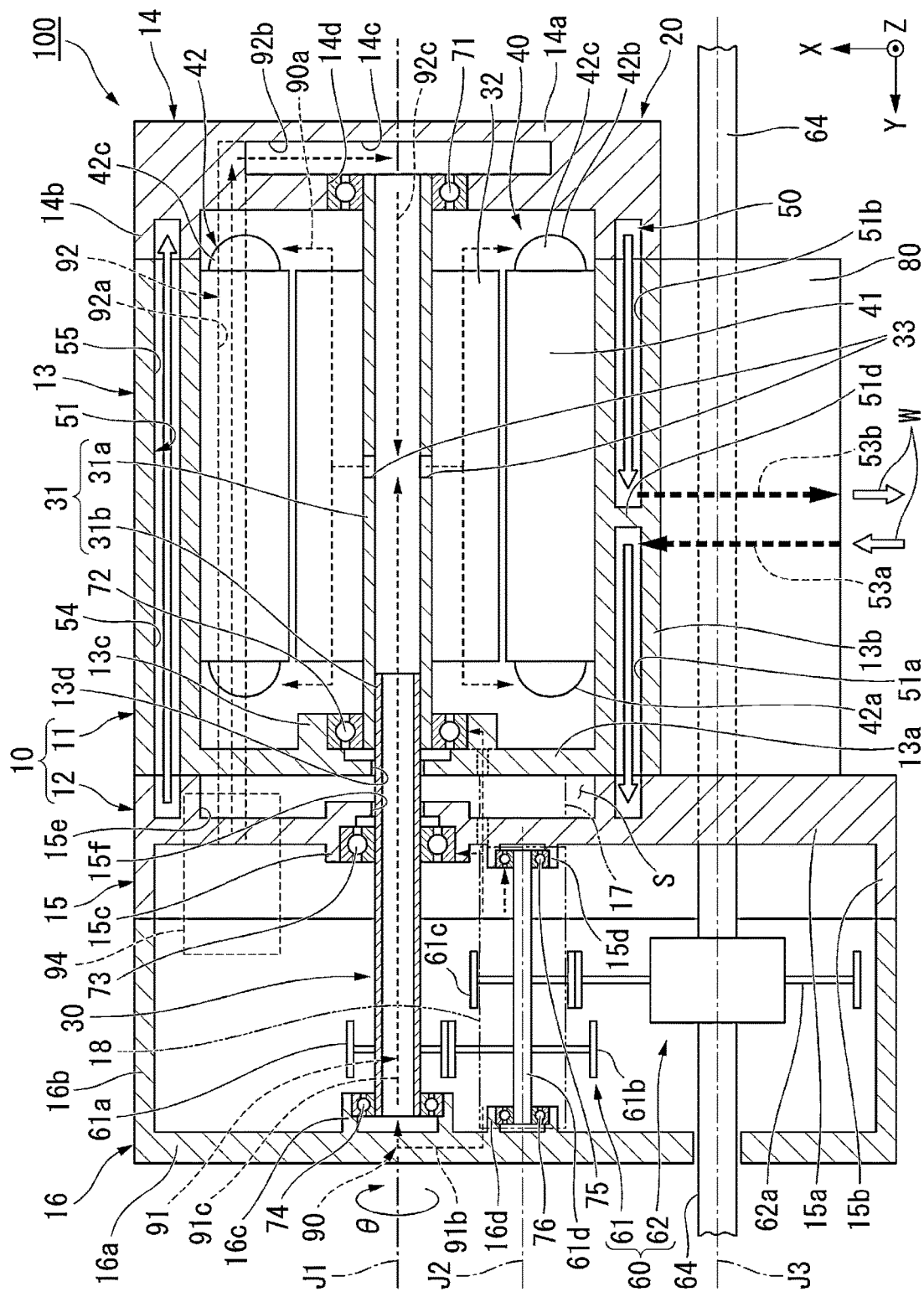
FIG. 1 is a cross-sectional view of a drive device of an embodiment as viewed from above.

The following description will be made with a vertical direction being defined on the basis of a positional relationship in the case where a drive device of the embodiment is mounted in a vehicle positioned on a horizontal road surface. That is, it is sufficient that a relative positional relationship regarding the vertical direction described in the following embodiment is satisfied at least in the case where the drive device is mounted in the vehicle positioned on the horizontal road surface.

In the drawings, an XYZ coordinate system is illustrated appropriately as a three-dimensional orthogonal coordinate system. In the XYZ coordinate system, a Z axis direction is the vertical direction. A +Z side is a vertically upper side, and a –Z side is a vertically lower side. In the following description, the vertically upper side and the vertically lower side will be simply called "upper side" and "lower side", respectively. An X axis direction is a direction orthogonal to the Z axis direction and is a front-rear direction of the vehicle mounted with the drive device. In the following embodiment, a +X side is a front side of the vehicle, and a –X side is a rear side of the vehicle. A Y axis direction is a direction orthogonal to both the X axis direction and the Z axis direction, and is a left-right direction of the vehicle, i.e., a vehicle width direction. In the following embodiment, a +Y side is a left side of the vehicle, and a –Y side is a right side of the vehicle. Each of the front-rear direction and the left-right direction is a horizontal direction orthogonal to the vertical direction.

Note that the positional relationship in the front-rear direction is not limited to the positional relationship of the embodiment below, and the +X side and the –X side may be a rear side and a front side, respectively, of the vehicle. In this case, the +Y side is the right side of the vehicle, and the −Y side is the left side of the vehicle. In the present description, a "parallel direction" includes a substantially parallel direction, and an "orthogonal direction" includes a substantially orthogonal direction.

A central axis J1 illustrated in the drawing as appropriate is an imaginary axis extending in a direction intersecting the vertical direction. More specifically, the central axis J1 extends in the Y axis direction orthogonal to the vertical direction, i.e., the left-right direction of the vehicle. In the following description, unless otherwise stated, a direction parallel to the central axis J1 is simply called "axial direction", a radial direction about the central axis J1 is simply called "radial direction", and a circumferential direction about the central axis J1, i.e., a direction around the central axis J1 is simply called "circumferential direction". In the present embodiment, the left side (+Y side) is called "axial one side", and the right side (−Y side) is called "axial other side".

An arrow θ illustrated in the drawings as appropriate indicates the circumferential direction. In the following description, a circumferential side of traveling counterclockwise about the central axis J1 as viewed from axial one side (+Y side), i.e., a side (+θ side) on which the arrow θ is directed is called "circumferential one side", and a circumferential side of traveling clockwise about the central axis J1 as viewed from axial one side, i.e., a side (−θ side) opposite to the side where the arrow θ is directed is called "circumferential other side".

Figure 2:
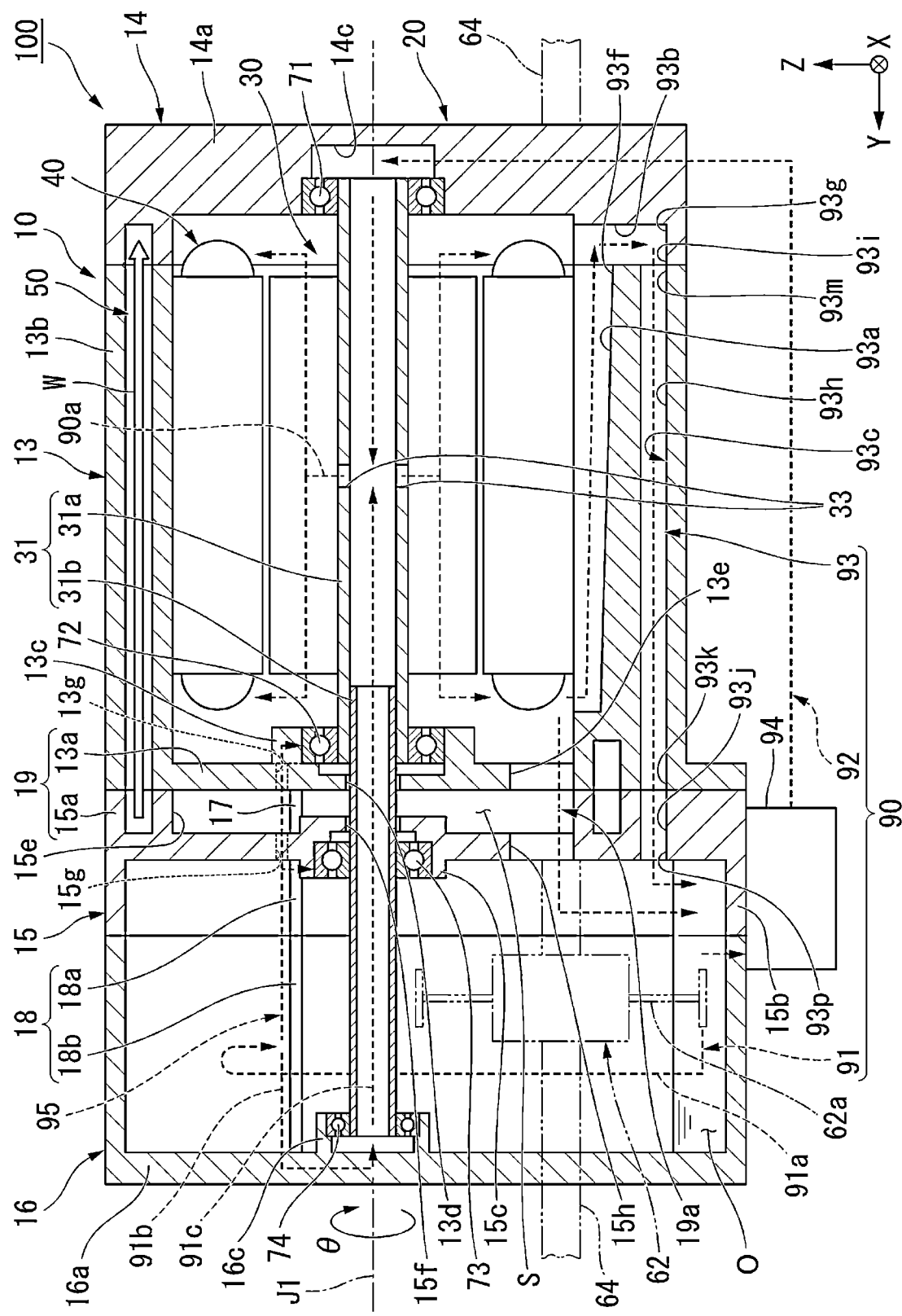
FIG. 2 is a cross-sectional view of the drive device of an embodiment as viewed from rear.

A drive device 100 of the present embodiment illustrated in FIGS. 1 and 2 is a drive device that is mounted on a vehicle and rotates an axle 64. The vehicle mounted with the drive device 100 is a vehicle with a motor as a power source, such as a hybrid vehicle (HEV), a plug-in hybrid vehicle (PHV), and an electric vehicle (EV). As illustrated in FIGS. 1 and 2, the drive device 100 includes a rotating electrical machine 20, a transmission mechanism 60, an inverter unit 80, and a pump 94.

In the present embodiment, the rotating electrical machine 20 is a motor that drives the drive device 100. The rotating electrical machine 20 includes a rotor 30 rotatable about the central axis J1 extending in the axial direction, a stator 40 facing the rotor 30 across a gap, a housing 10 internally accommodating the rotor 30 and the stator 40, and bearings 71 to 76. In the present embodiment, the housing 10 is also a housing of the drive device 100. In the present embodiment, the housing 10 includes a motor housing 11 internally accommodating the rotor 30 and the stator 40, and a transmission mechanism housing 12 internally accommodating the transmission mechanism 60. The motor housing 11 and the transmission mechanism housing 12 are separate bodies fixed to each other. The transmission mechanism housing 12 is fixed to axial one side of the motor housing 11. That is, the transmission mechanism housing 12 is joined to axial one side of the motor housing 11. The bearings 71 to 76 are, for example, ball bearings.

The rotor 30 includes a shaft 31 and a rotor body 32. The shaft 31 is rotatable about the central axis J1. The shaft 31 is rotatably supported by the bearings 71, 72, 73, and 74. Due to this, the bearings 71, 72, 73, and 74 rotatably support the rotor 30.

In the present embodiment, the shaft 31 is a hollow shaft. The shaft 31 has a cylindrical shape extending axially about the central axis J1. The shaft 31 is provided with a hole part 33 joining the inside of the shaft 31 and the outside of the shaft 31. The shaft 31 extends across the inside of the motor housing 11 and the inside of the transmission mechanism housing 12. An end part on axial one side of the shaft 31 protrudes into the transmission mechanism housing 12. A speed reduction device 61 is connected to the end part on axial one side of the shaft 31.

In the present embodiment, the shaft 31 is configured by axially coupling a first shaft member 31a and a second shaft member 31b. The first shaft member 31a is accommodated in the motor housing 11. The first shaft member 31a is provided with the hole part 33. The second shaft member 31b is coupled to axial one side of the first shaft member 31a. The outer diameter of the second shaft member 31b is smaller than the outer diameter of the first shaft member 31a. The end part on the axial other side of the second shaft member 31b is fitted into the inside at the end part on axial one side of the first shaft member 31a. The second shaft member 31b extends from the inside of the motor housing 11 to the inside of the transmission mechanism housing 12. The first shaft member 31a and the second shaft member 31b are coupled to each other by spline fitting, for example. The first shaft member 31a is rotatably supported by the bearings 71 and 72. The second shaft member 31b is rotatably supported by the bearings 73 and 74.

The rotor body 32 is fixed to the outer peripheral face of the shaft 31. More specifically, the rotor body 32 is fixed to the outer peripheral face of the first shaft member 31a. Although not illustrated, the rotor body 32 includes a rotor core, and a rotor magnet fixed to the rotor core.

The stator 40 is positioned radially outside the rotor 30. The stator 40 is fixed inside the motor housing 11. The stator 40 includes a stator core 41 and a coil assembly 42. The stator core 41 has an annular shape surrounding the rotor 30. The coil assembly 42 has a plurality of coils 42c attached to the stator core 41 along the circumferential direction. The plurality of coils 42c are attached to the stator core 41 via an insulator not illustrated. Although not illustrated, the coil assembly 42 may include a binding member or the like that binds the coils 42c together, and may include a passage line joining the coils 42c to one another. The coil assembly 42 includes a coil end 42a protruding from the stator core 41 to axial one side and a coil end 42b protruding from the stator core 41 to the axial other side.

The transmission mechanism 60 is connected to the rotor 30. The transmission mechanism 60 transmits rotation of the rotor 30 to the axle 64 of the vehicle. As illustrated in FIG. 1, the transmission mechanism 60 of the present embodiment includes the speed reduction device 61 connected to the rotor 30 and a differential device 62 connected to the speed reduction device 61.

The speed reduction device 61 includes a first gear 61a, a second gear 61b, a third gear 61c, and a gear shaft 61d. The first gear 61a is fixed to a part of the shaft 31 positioned inside the transmission mechanism housing 12. The second gear 61b and the third gear 61c are fixed to the gear shaft 61d. The second gear 61b meshes with the first gear 61a. The gear shaft 61d extends in the axial direction about a gear axis J2 extending in parallel with the central axis J1. The gear axis J2 is an imaginary axis positioned on the lower side relative to the central axis J1. The gear axis J2 is positioned on the rear side (−X side) relative to the central axis J1, for example. The gear shaft 61d is rotatably supported by the bearings 75 and 76.

The differential device 62 includes a ring gear 62a. The ring gear 62a meshes with the third gear 61c. An end part on the lower side of the ring gear 62a is immersed in an oil O stored in the transmission mechanism housing 12. When the ring gear 62a rotates, the oil O is brought up. The oil O having been brought up is supplied to, for example, the speed reduction device 61 and the differential device 62 as lubricating oil. The differential device 62 rotates the axle 64 about a differential axis J3. The differential axis J3 is an imaginary axis extending in parallel with the central axis J1.

The motor housing 11 has a first housing member 13 and a second housing member 14. That is, the housing 10 includes the first housing member 13 and the second housing member 14.

The first housing member 13 is a tubular member surrounding the stator 40 radially outside the stator 40. In the present embodiment, the inner peripheral face of the first housing member 13 has a cylindrical shape centered on the central axis J1. The first housing member 13 is open to the axial other side. The first housing member 13 is fixed to the transmission mechanism housing 12. The stator core 41 is fitted inside the first housing member 13. The first housing member 13 includes a first facing wall portion 13a expanding in the radial direction, a peripheral wall portion 13b extending to the axial other side from a radially outer peripheral edge part of the first facing wall portion 13a, and a bearing holding portion 13c provided on the first facing wall portion 13a.

The first facing wall portion 13a axially faces the transmission mechanism housing 12. The first facing wall portion 13a is positioned on the axial other side of the transmission mechanism housing 12. The first facing wall portion 13a is fixed to the transmission mechanism housing 12. The first facing wall portion 13a has a hole 13d axially penetrating the first facing wall portion 13a. The hole 13d is a hole having a circular shape centered on the central axis J1. The second shaft member 31b axially passes through the hole 13d.

As illustrated in FIG. 2, the first facing wall portion 13a has a through hole 13e axially penetrating the first facing wall portion 13a. The through hole 13e is a through hole joining a space S positioned axially between the first facing wall portion 13a and a second facing wall portion 15a described later and the inside of the motor housing 11. The through hole 13e is provided in a part of the first facing wall portion 13a positioned on the lower side relative to the bearing holding portion 13c. The end part on the lower side of the through hole 13e is joined to the inner peripheral face of the peripheral wall portion 13b.

Figure 3:
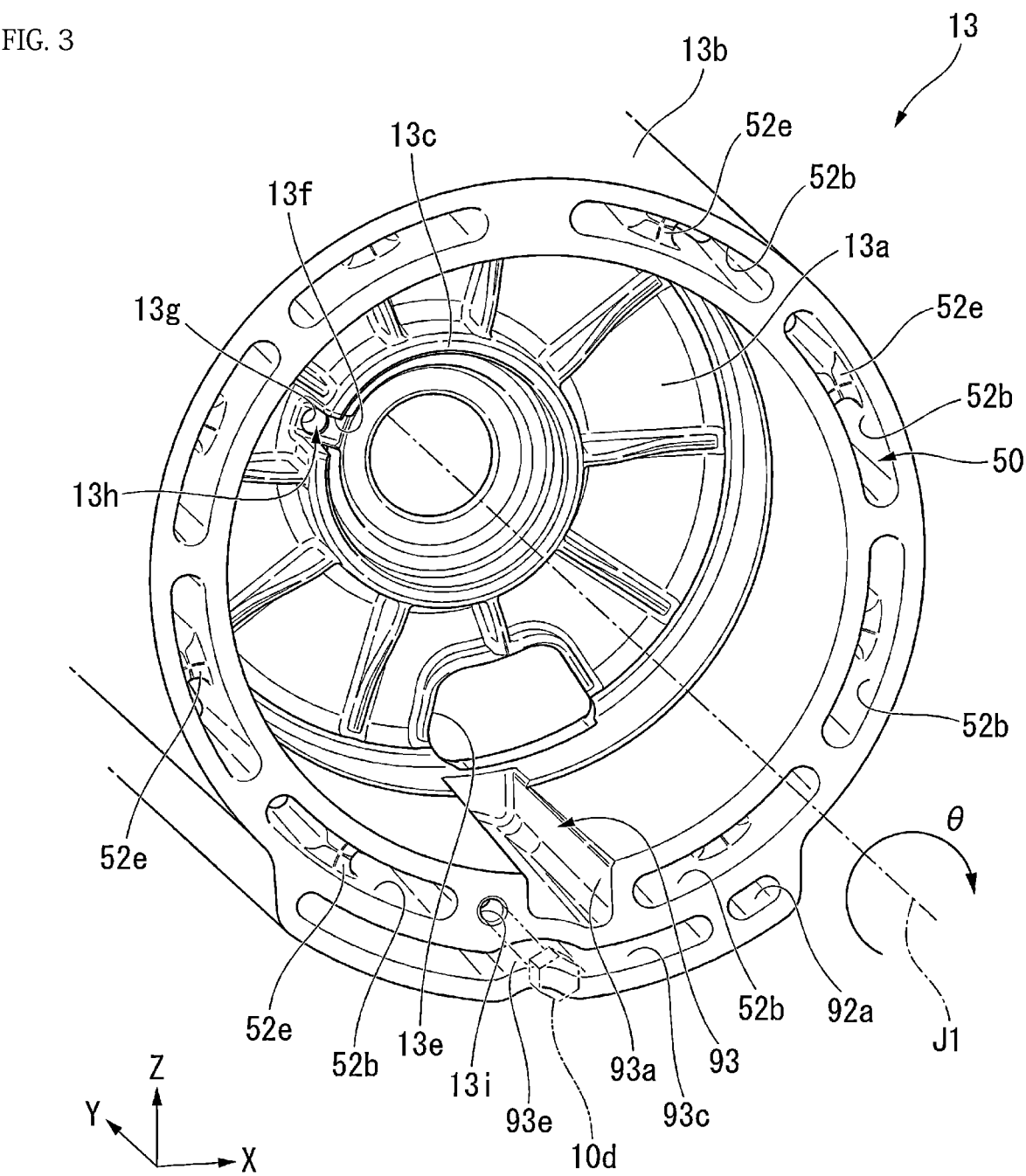
FIG. 3 is a perspective view illustrating a part of a first housing member of a motor housing of an embodiment.

In the present embodiment, the bearing holding portion 13c is provided on the surface on the axial other side of the first facing wall portion 13a. The bearing holding portion 13c protrudes to the axial other side from the surface on the axial other side of the first facing wall portion 13a. As illustrated in FIG. 3, the bearing holding portion 13c has a cylindrical shape centered on the central axis J1. The bearing holding portion 13c has a penetration portion 13f radially penetrating the bearing holding portion 13c. In the present embodiment, the penetration portion 13f radially penetrates a part of the bearing holding portion 13c positioned on the upper side relative to the central axis J1 and on the rear side (−X side). The penetration portion 13f extends rearward and obliquely upward from the inner peripheral face of the bearing holding portion 13c to the outer peripheral face of the bearing holding portion 13c. As illustrated in FIG. 1, the bearing holding portion 13c internally holds the bearing 72.

Figure 4:
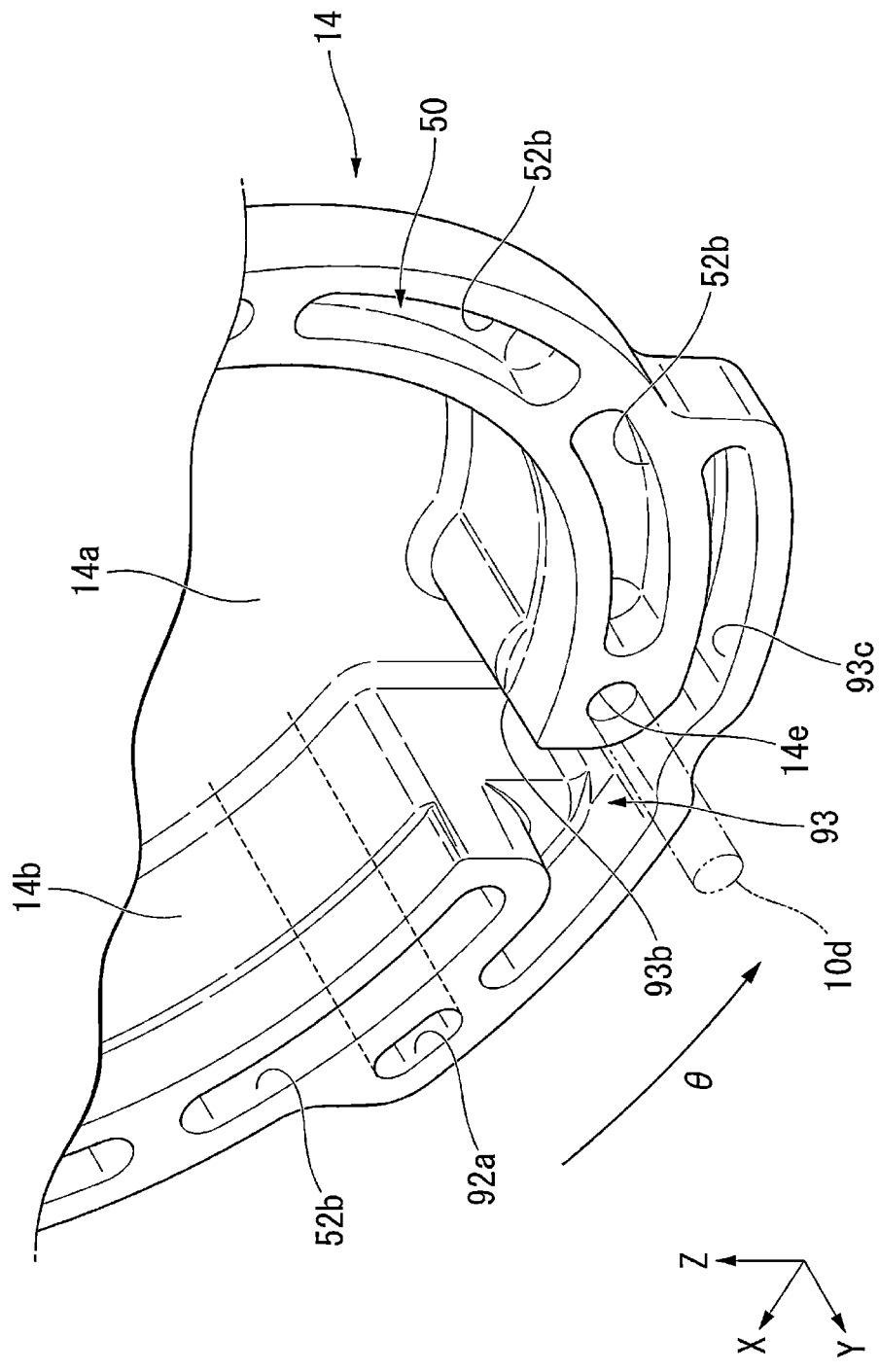
FIG. 4 is a perspective view illustrating a part of a second housing member of the motor housing of an embodiment.

The second housing member 14 is separate from the first housing member 13. The second housing member 14 is fixed to the axial other side of the first housing member 13. The second housing member 14 closes an opening on the axial other side of the first housing member 13. As illustrated in FIG. 4, the second housing member 14 includes a lid wall portion 14a expanding in the radial direction, and a peripheral wall portion 14b extending to axial one side from a radially outer peripheral edge part of the lid wall portion 14a. As illustrated in FIG. 1, an end part on axial one side of the peripheral wall portion 14b is in contact with an end part on the axial other side of the peripheral wall portion 13b in the first housing member 13. The lid wall portion 14a has a recess part 14c recessed from the surface on axial one side of the lid wall portion 14a to the axial other side. A part on axial one side of the recess part 14c is a bearing holding portion 14d internally holding the bearing 71.

In the present embodiment, the inverter unit 80 is attached to the motor housing 11. The inverter unit 80 is fixed to a rear surface of the motor housing 11. Although not illustrated, the inverter unit 80 has an inverter circuit electrically connected to the stator 40.

The transmission mechanism housing 12 internally accommodates the speed reduction device 61 and the differential device 62. As illustrated in FIG. 2, the transmission mechanism housing 12 protrudes on the lower side relative to the motor housing 11. The bottom surface positioned on the lower side of the inner surface of the transmission mechanism housing 12 is positioned on the lower side relative to the bottom surface positioned on the lower side of the inner surface of the motor housing 11. The transmission mechanism housing 12 includes a third housing member 15 fixed to axial one side of the first housing member 13 and a fourth housing member 16 fixed to axial one side of the third housing member 15. That is, the housing 10 includes the third housing member 15 and the fourth housing member 16.

The third housing member 15 includes a second facing wall portion 15a expanding in the radial direction, a peripheral wall portion 15b extending to axial one side from a radially outer peripheral edge part of the second facing wall portion 15a, and bearing holding portions 15c and 15d provided on the second facing wall portion 15a. The second facing wall portion 15a axially faces the first facing wall portion 13a. The second facing wall portion 15a is fixed to axial one side of the first facing wall portion 13a. The second facing wall portion 15a has a hole 15f axially penetrating the second facing wall portion 15a. The hole 15f is a hole having a circular shape centered on the central axis J1. The second shaft member 31b axially passes through the hole 15f.

The second facing wall portion 15a has a recess part 15e recessed from the surface on the axial other side of the second facing wall portion 15a to axial one side. The inner peripheral edge of the recess part 15e has, for example, a circular shape centered on the central axis J1 as viewed in the axial direction. The opening on the axial other side of the recess part 15e is closed by the first facing wall portion 13a. The space S is provided axially between the first facing wall portion 13a and the second facing wall portion 15a. The space S is configured by the inside of the recess part 15e.

As illustrated in FIG. 2, the second facing wall portion 15a has a through hole 15h axially penetrating the second facing wall portion 15a. The through hole 15h is a through hole joining a space S positioned axially between the first facing wall portion 13a and the second facing wall portion 15a and the inside of the transmission mechanism housing 12. The through hole 15h is provided in a part of the second facing wall portion 15a positioned on the lower side relative to the bearing holding portion 15c. The through hole 15h is provided at the end part on the lower side of the bottom surface of the recess part 15e. The bottom surface of the recess part 15e is a surface of the inner surface of the recess part 15e positioned on axial one side and facing the axial other side. The end part on the lower side of the through hole 15*h* is joined to the inner peripheral face of the recess part 15*e*. For example, the through hole 15*h* is arranged to face, with a gap, axial one side of the through hole 13*e* provided in the first facing wall portion 13*a*, for example.

In the present embodiment, the first facing wall portion 13*a* and the second facing wall portion 15*a* constitute a division wall portion 19 dividing the inside of the motor housing 11 and the inside of the transmission mechanism housing 12. That is, the housing 10 has the division wall portion 19. The division wall portion 19 has a through hole 19*a* joining the inside of the motor housing 11 and the inside of the transmission mechanism housing 12. The through hole 19*a* axially penetrates the division wall portion 19. In the present embodiment, the through hole 19*a* is configured by the through hole 13*e* provided in the first facing wall portion 13*a*, the end part on the lower side of the recess part 15*e*, and the through hole 15*h* provided in the second facing wall portion 15*a*.

Figure 5:
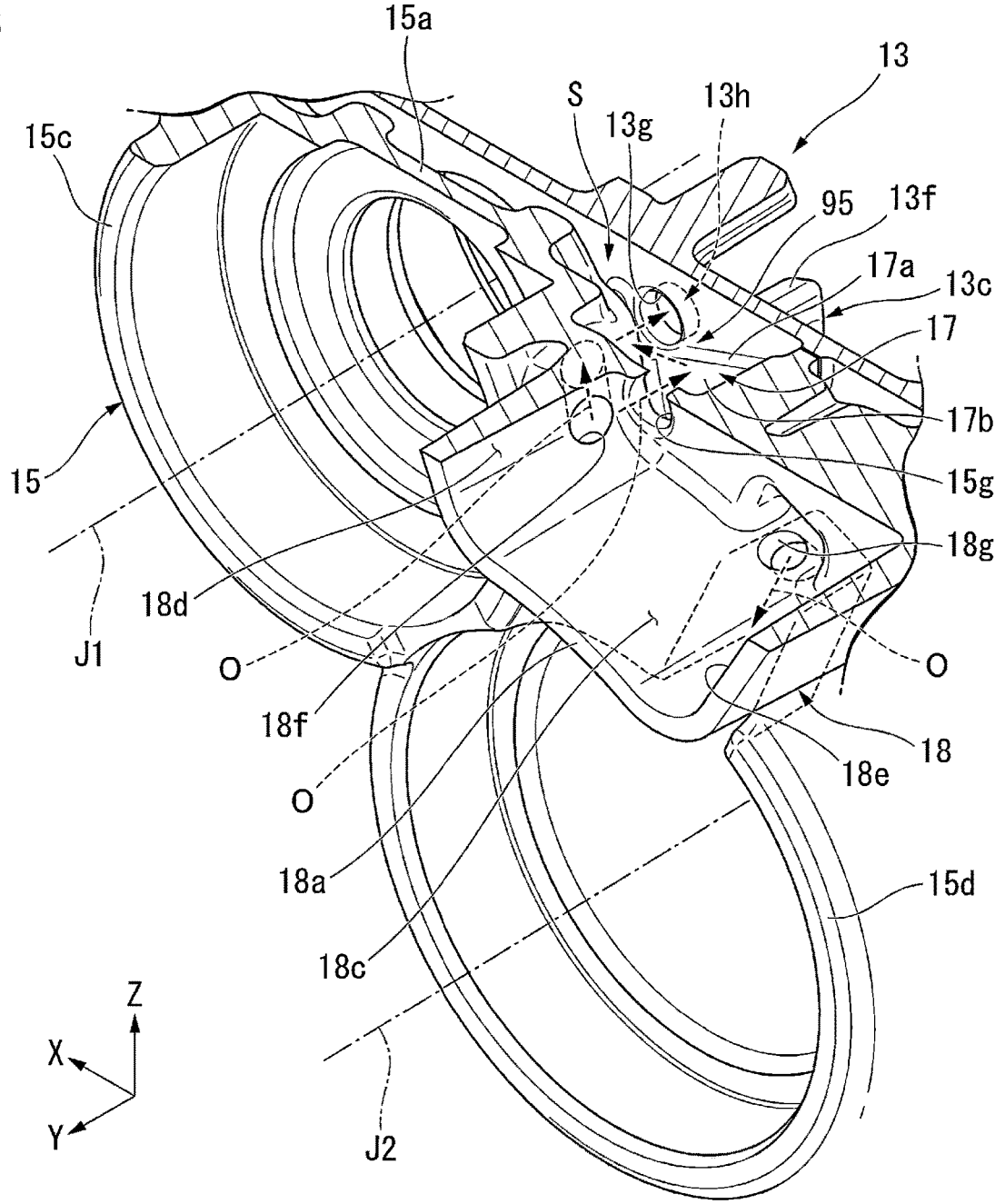
FIG. 5 is a cross-sectional perspective view illustrating a part of an oil supply path of an embodiment.

In the present embodiment, the bearing holding portions 15*c* and 15*d* are provided on the surface on axial one side of the second facing wall portion 15*a*. The bearing holding portions 15*c* and 15*d* protrude to axial one side from the surface on axial one side of the second facing wall portion 15*a*. As illustrated in FIG. 5, the bearing holding portion 15*c* has a cylindrical shape centered on the central axis J1. The bearing holding portion 15*d* has a cylindrical shape centered on the gear axis J2. As illustrated in FIG. 1, the bearing holding portion 15*c* internally holds the bearing 73. The bearing holding portion 15*d* internally holds the bearing 75.

The fourth housing member 16 includes a lid wall portion 16*a* expanding in the radial direction, a peripheral wall portion 16*b* extending to the axial other side from a radially outer peripheral edge part of the lid wall portion 16*a*, and bearing holding portions 16*c* and 16*d* provided on the lid wall portion 16*a*. The end part on the axial other side of the peripheral wall portion 16*b* is in axial contact with the end part on axial one side of the peripheral wall portion 15*b* of the third housing member 15.

In the present embodiment, the bearing holding portions 16*c* and 16*d* are provided on the surface on the axial other side of the lid wall portion 16*a*. The bearing holding portions 16*c* and 16*d* protrude to the axial other side from the surface on the axial other side of the lid wall portion 16*a*. Although not illustrated, the bearing holding portion 16*c* has a cylindrical shape centered on the central axis J1. The bearing holding portion 16*d* has a cylindrical shape centered on the gear axis J2. The bearing holding portion 16*c* internally holds the bearing 74. The bearing holding portion 16*d* internally holds the bearing 76.

For example, the oil O is accommodated in the transmission mechanism housing 12. The oil O is stored in a lower region in the transmission mechanism housing 12. The oil O is used as a refrigerant for cooling the rotating electrical machine 20. The oil O is also used as a lubricating oil for the speed reduction device 61 and the differential device 62. As the oil O, for example, in order to achieve a function as a refrigerant and as a lubricating oil, it is preferable to use an oil equivalent to an automatic transmission fluid (ATF) having a relatively low viscosity.

In the present embodiment, a pump 94 is attached to the transmission mechanism housing 12. The pump 94 is attached to a lower surface of the transmission mechanism housing 12. The pump 94 is a pump that causes the oil O to flow into a second supply flow path 92 described later. In the present embodiment, the pump 94 is an electric pump. The pump 94 may be a mechanical pump rotated by the shaft 31 or the gear shaft 61*d*.

Although not illustrated, a seal member seals axially between the first housing member 13 and the second housing member 14, axially between the first housing member 13 and the third housing member 15, and axially between the third housing member 15 and the fourth housing member 16. The seal member is, for example, a liquid gasket.

Figure 6:
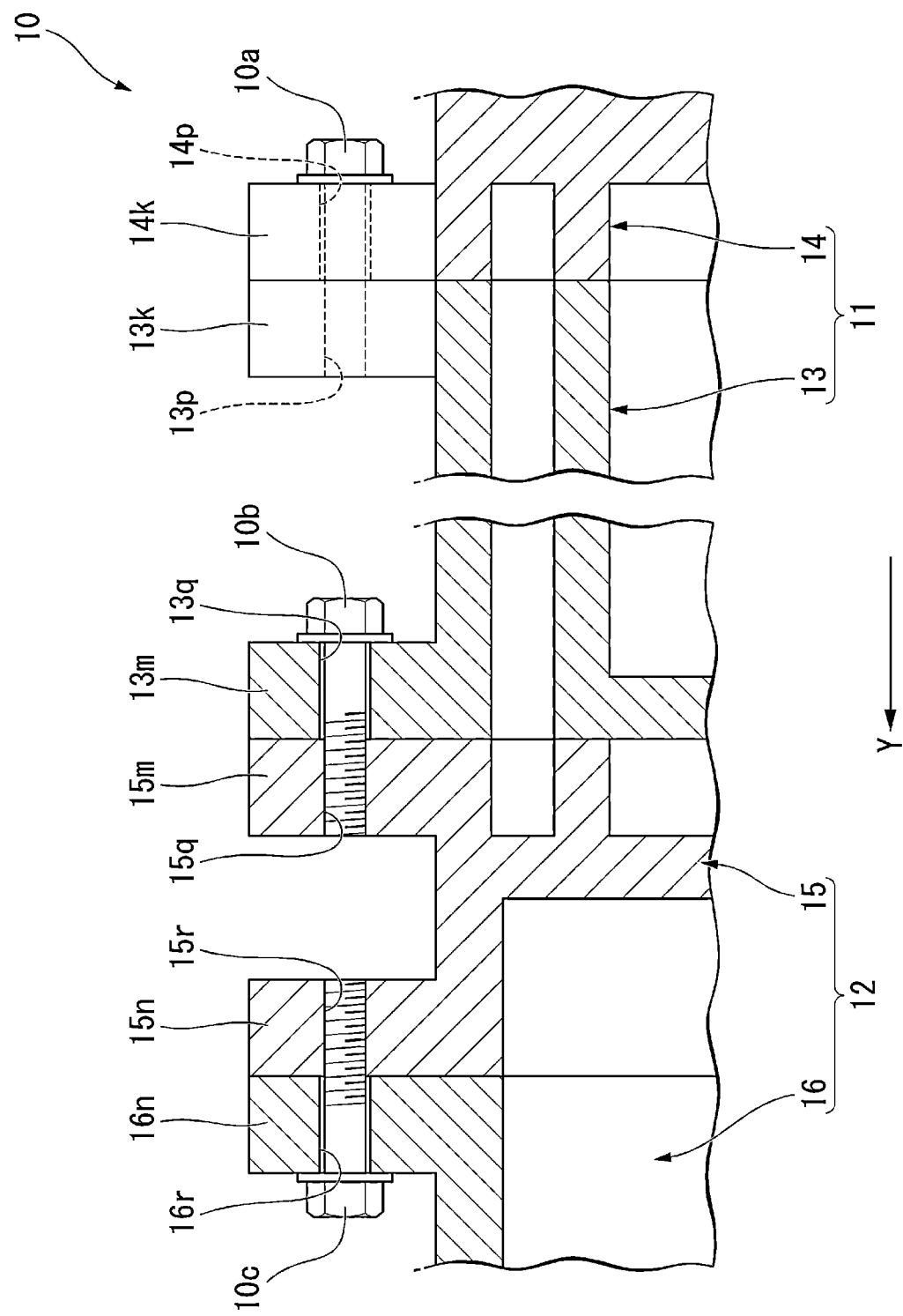
FIG. 6 is a cross-sectional view illustrating a part of a housing of an embodiment.

In the present embodiment, the first housing member 13, the second housing member 14, the third housing member 15, and the fourth housing member 16 are fixed with bolts. More specifically, as illustrated in FIG. 6, the first housing member 13 and the second housing member 14 are fixed to each other by a bolt 10*a*. The first housing member 13 and the third housing member 15 are fixed to each other by a bolt 10*b*. The third housing member 15 and the fourth housing member 16 are fixed to each other by a bolt 10*c*. A plurality of the bolts 10*a*, a plurality of the bolts 10*b*, and a plurality of the bolts 10*c* are provided to surround the central axis J1.

Figure 7:
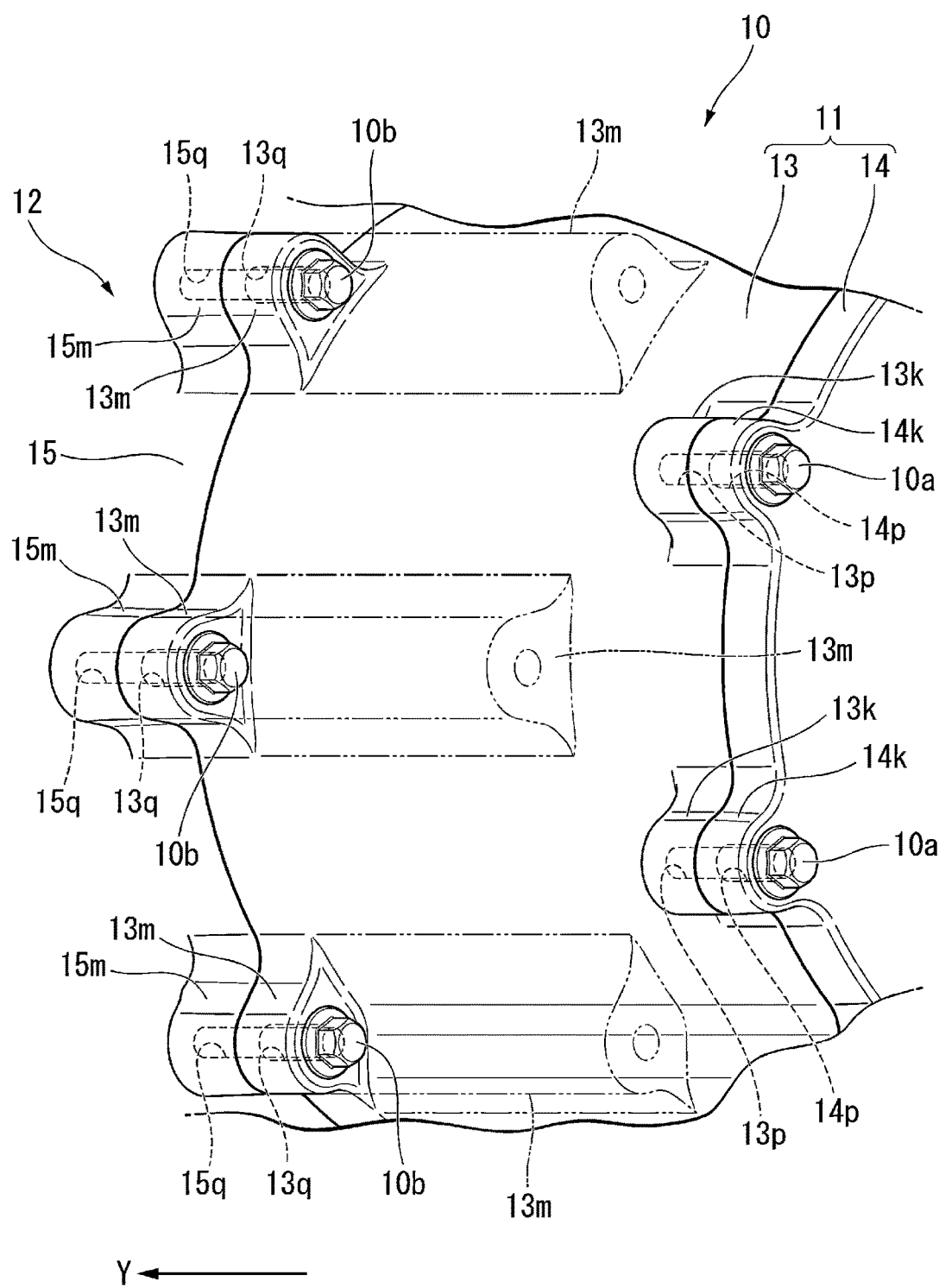
FIG. 7 is a perspective view illustrating a part of the housing of an embodiment.

The plurality of bolts 10*a* fix a plurality of protrusion portions 13*k* provided on the outer peripheral face of the first housing member 13 and a plurality of protrusion portions 14*k* provided on the outer peripheral face of the second housing member 14. The protrusion portion 13*k* is provided at the end part on the axial other side of the outer peripheral face of the first housing member 13. The protrusion portion 13*k* protrudes radially outward. As illustrated in FIG. 7, the plurality of protrusion portions 13*k* are arranged at intervals along the circumferential direction. The protrusion portion 13*k* has a female screw hole 13*p* recessed to axial one side from the surface on the axial other side of the protrusion portion 13*k*. In the present embodiment, the female screw hole 13*p* axially penetrates the protrusion portion 13*k*. The female screw hole 13*p* may be a hole having a bottom part on axial one side.

The protrusion portion 14*k* is provided at the end part on axial one side of the outer peripheral face of the second housing member 14. The protrusion portion 14*k* protrudes radially outward. The plurality of protrusion portions 14*k* are arranged at intervals along the circumferential direction. The surface on axial one side of the protrusion portion 14*k* is in contact with the surface on the axial other side of the protrusion portion 13*k*. The protrusion portion 14*k* has a fixing hole 14*p* axially penetrating the protrusion portion 14*k*. As viewed in the axial direction, the fixing hole 14*p* and the female screw hole 13*p* overlap each other. The bolt 10*a* passes through the fixing hole 14*p* from the axial other side and is tightened into the female screw hole 13*p*. Due to this, the first housing member 13 and the second housing member 14 are fixed with the bolt 10*a*.

The plurality of bolts 10*b* fix a plurality of protrusion portions 13*m* provided on the outer peripheral face of the first housing member 13 and a plurality of protrusion portions 15*m* provided on the outer peripheral face of the third housing member 15. The protrusion portion 13*m* is provided at the end part on axial one side of the outer peripheral face of the first housing member 13. The protrusion portion 13*m* protrudes radially outward. The plurality of protrusion portions 13*m* are arranged at intervals along the circumferential direction. The circumferential position of the protrusion portion 13*m* is shifted with respect to the circumferential position of the protrusion portion 13*k*. The circumferential position of the protrusion portion 13*m* is a circumferential central position between the protrusion portions 13*k* adjacent in the circumferential direction, for example. The protrusion portion 13*m* has a fixing hole 13*q* axially penetrating the protrusion portion 13*m*.

The protrusion portion 15*m* is provided at the end part on the axial other side of the outer peripheral face of the third housing member 15. The protrusion portion 15m protrudes radially outward. The plurality of protrusion portions 15m are arranged at intervals along the circumferential direction. The surface on the axial other side of the protrusion portion 15m is in contact with the surface on axial one side of the protrusion portion 13m. The protrusion portion 15m has a female screw hole 15q recessed to axial one side from the surface on the axial other side of the protrusion portion 15m. In the present embodiment, the female screw hole 15q axially penetrates the protrusion portion 15m. The female screw hole 15q may be a hole having a bottom part on axial one side.

As viewed in the axial direction, the fixing hole 13q and the female screw hole 15q overlap each other. The bolt 10b passes through the fixing hole 13q from the axial other side and is tightened into the female screw hole 15q. Due to this, the first housing member 13 and the third housing member 15 are fixed with the bolt 10b.

In this manner, in the present embodiment, the first housing member 13 and the third housing member 15 are fixed to each other by the bolt 10b tightened from the same side as the bolt 10a for fixing the first housing member 13 and the second housing member 14. That is, the bolt 10b for fixing the first housing member 13 and the third housing member 15 is inserted into the fixing hole 13q and the female screw hole 15q in the same orientation as the bolt 10a for fixing the first housing member 13 and the second housing member 14.

As illustrated in FIG. 6, the bolt 10c fixes a protrusion portion 15n provided at the end part on axial one side of the outer peripheral face of the third housing member 15 and a protrusion portion 16n provided at the end part on the axial other side of the outer peripheral face of the fourth housing member 16. Although not illustrated, a plurality of the protrusion portions 15n and a plurality of the protrusion portions 16n are provided at intervals in the circumferential direction. The protrusion portion 15n and the protrusion portion 16n protrude radially outward. The circumferential positions of the protrusion portion 15n and the protrusion portion 16n may be the same as the circumferential positions of the protrusion portion 13m and the protrusion portion 15m, or may be positions shifted in the circumferential direction.

The protrusion portion 15n has a female screw hole 15r recessed to the axial other side from the surface on axial one side of the protrusion portion 15n. In the present embodiment, the female screw hole 15r axially penetrates the protrusion portion 15n. The female screw hole 15r may be a hole having a bottom part on the axial other side. The protrusion portion 16n has a fixing hole 16r axially penetrating the protrusion portion 16n. The bolt 10c passes through the fixing hole 16r from axial one side and is tightened into the female screw hole 15r. Due to this, the third housing member 15 and the fourth housing member 16 are fixed with the bolt 10c.

In this manner, in the present embodiment, the third housing member 15 and the fourth housing member 16 are fixed to each other by the bolt 10c tightened from the side opposite to the side where the bolt 10a for fixing the first housing member 13 and the second housing member 14 and the bolt 10b for fixing the first housing member 13 and the third housing member 15 are tightened. That is, the bolt 10c for fixing the third housing member 15 and the fourth housing member 16 is inserted into the fixing hole 16r and the female screw hole 15r in an orientation different from that of the bolt 10a for fixing the first housing member 13 and the second housing member 14 and the bolt 10b for fixing the first housing member 13 and the third housing member 15.

As described above, in the present embodiment, the first housing member 13 and the third housing member 15 are fixed by the bolt 10b from the same side as the side of the axial direction where the first housing member 13 and the second housing member 14 are fixed by the bolt 10a. Therefore, the work of fixing the first housing member 13 and the second housing member 14 and the work of fixing the first housing member 13 and the third housing member 15 can be performed from the same side in the axial direction, i.e., the axial other side in the present embodiment. This can improve assembling workability of the housing 10.

Here, in the present embodiment, the transmission mechanism housing 12 has a shape protruding radially outward relative to the motor housing 11. In such a case, when an attempt is made to fix the first housing member 13 and the third housing member 15 by inserting the bolt from the side where the transmission mechanism housing 12 is positioned with respect to the motor housing 11, i.e., from axial one side, it is necessary to arrange the fixing part of the bolt on the radially outside in order to avoid interference with the transmission mechanism housing 12 itself. Therefore, the housing 10 tends to increase in size.

On the other hand, for example, by tightening the first housing member 13, the third housing member 15, and the fourth housing member 16 together with a bolt inserted from axial one side, it is possible to fix the first housing member 13 and the third housing member 15 while suppressing the housing 10 from increasing in size. However, in this case, when the bolt is removed to separate the motor housing 11 and the transmission mechanism housing 12, the third housing member 15 and the fourth housing member 16 constituting the transmission mechanism housing 12 are also separated. Therefore, in a state of not being fixed to the motor housing 11, the transmission mechanism housing 12 cannot be handled in a combined state. Due to this, the assembling property of the housing 10 tends to deteriorate. Workability tends to deteriorate when maintenance of the drive device 100 is performed, when the transmission mechanism 60 is replaced, and the like.

The axial force by the bolt necessary for suitably maintaining the sealing property may be different between the seal member provided axially between the first housing member 13 and the third housing member 15 and the seal member provided axially between the third housing member 15 and the fourth housing member 16. Therefore, when the first housing member 13, the third housing member 15, and the fourth housing member 16 are tightened together with the same bolt, it may be difficult to suitably apply the axial force to the seal members arranged between the respective housing members. Therefore, problems such as a decrease in sealing property between the housing members and difficulty in adjusting the axial force of the bolt easily occur.

The problem in the case of tightening the first housing member 13, the third housing member 15, and the fourth housing member 16 together with the bolt inserted from axial one side is the same as the problem in the case of tightening the first housing member 13, the second housing member 14, and the third housing member 15 together with the bolt inserted from the axial other side.

In view of the above problem, according to the present embodiment, as described above, the first housing member 13 and the third housing member 15 are fixed by the bolt 10b from the same side as the side of the axial direction where the first housing member 13 and the second housing member 14 are fixed by the bolt 10a. Therefore, it is possible to suppress the bolt 10b from interfering with the transmission mechanism housing 12 even if the position of the part fixed by the bolt 10b is not changed to the more radially outer position. This makes it possible to fix the first housing member 13 and the third housing member 15 with the bolt 10b while suppressing the housing 10 from increasing in size. Even if the bolt 10b is removed, only the first housing member 13 and the third housing member 15 are separated, and the third housing member 15 and the fourth housing member 16 are not separated. Therefore, even in a state of being not fixed to the motor housing 11, the transmission mechanism housing 12 can be handled in a combined state. This makes it possible to suppress the assembling property of the housing 10 from deteriorating. It is possible to suppress the workability from deteriorating when maintenance of the drive device 100 is performed, when the transmission mechanism 60 is replaced, and the like. Since the axial forces of the bolt 10b and the bolt 10c can be changed, different axial forces can be individually applied to the seal member positioned between the first housing member 13 and the third housing member 15 and the seal member positioned between the third housing member 15 and the fourth housing member 16. Due to this, the sealing property between the housing members can be easily secured, and the axial forces of the bolts 10b and 10c can be easily adjusted. The same applies to the seal member between the first housing member 13 and the second housing member 14.

For example, if another housing member is arranged between the motor housing 11 and the transmission mechanism housing 12 and the motor housing 11 and the transmission mechanism housing 12 are fixed to the other housing member, the motor housing 11 and the transmission mechanism housing 12 can be separated in an assembled state. However, in this case, the number of components constituting the housing 10 increases by the provision of the other housing member. On the other hand, according to the present embodiment, as described above, it is possible to separate the motor housing 11 and the transmission mechanism housing 12 in an assembled state without providing the other member. Therefore, it is possible to suppress the number of components constituting the housing 10 from increasing. Since it is not necessary to provide the other member, it is possible to reduce the weight of the drive device 100. Due to this, even when the structure of the drive device 100 is a water-cooled structure that cools the rotating electrical machine 20 with water W as in the present embodiment, it is possible to suppress the weight of the entire drive device 100 from increasing.

As indicated by a two-dot chain line in FIG. 7, the protrusion portion 13m provided in the first housing member 13 may extend in the axial direction. In this case, the end part on the axial other side of the protrusion portion 13m can be brought close to the protrusion portion 13k. Due to this, when the work of fixing the first housing member 13 and the third housing member 15 is performed from the axial other side, the positions where a jig and a tool for tightening the bolt 10b are used can be brought close to the positions where the jig and the tool are used when the work of fixing the first housing member 13 and the second housing member 14 is performed. Axial dimensions of the jig and the tool can be shortened. These can improve the workability of the work of fixing the first housing member 13 and the third housing member 15 with the bolt 10b. In particular, the bolt 10b can be suitably tightened to suitably generate the axial force.

The end part on the axial other side of the protrusion portion 13m indicated by the two-dot chain line in FIG. 7 is positioned, for example, on the axial other side relative to the center in the axial direction of the first housing member 13. The end part on the axial other side of the protrusion portion 13m indicated by the two-dot chain line in FIG. 7 is positioned, for example, on axial one side relative to the end part on axial one side of the protrusion portion 13k. This can suppress the protrusion portion 13m from interfering with the protrusion portion 13k.

As illustrated in FIGS. 3 and 4, in the present embodiment, the first housing member 13 and the second housing member 14 are fixed also by a bolt 10d different from the plurality of bolts 10a described above. As illustrated in FIG. 3, the first housing member 13 has a female screw hole 13i recessed to axial one side from the end surface on the axial other side of the peripheral wall portion 13b. The female screw hole 13i is positioned circumferentially between a groove portion 93a described later and a second circumferential flow path portion 52b of a second flow path 50 described later. The female screw hole 13i is positioned radially inside a collection flow path body portion 93c described later.

As illustrated in FIG. 4, the second housing member 14 has a fixing hole 14e axially penetrating the second housing member 14. The fixing hole 14e is positioned circumferentially between a connection portion 93b described later and the second circumferential flow path portion 52b of the second flow path 50 described later. The fixing hole 14e is positioned radially inside a collection flow path body portion 93c described later. The bolt 10d having passed through the fixing hole 14e from the axial other side is tightened into the female screw hole 13i. Due to this, in the present embodiment, the first housing member 13 and the second housing member 14 are fixed to each other at positions radially inside a collection flow path 93 described later and circumferentially adjacent to the second flow path 50.

Figure 8:
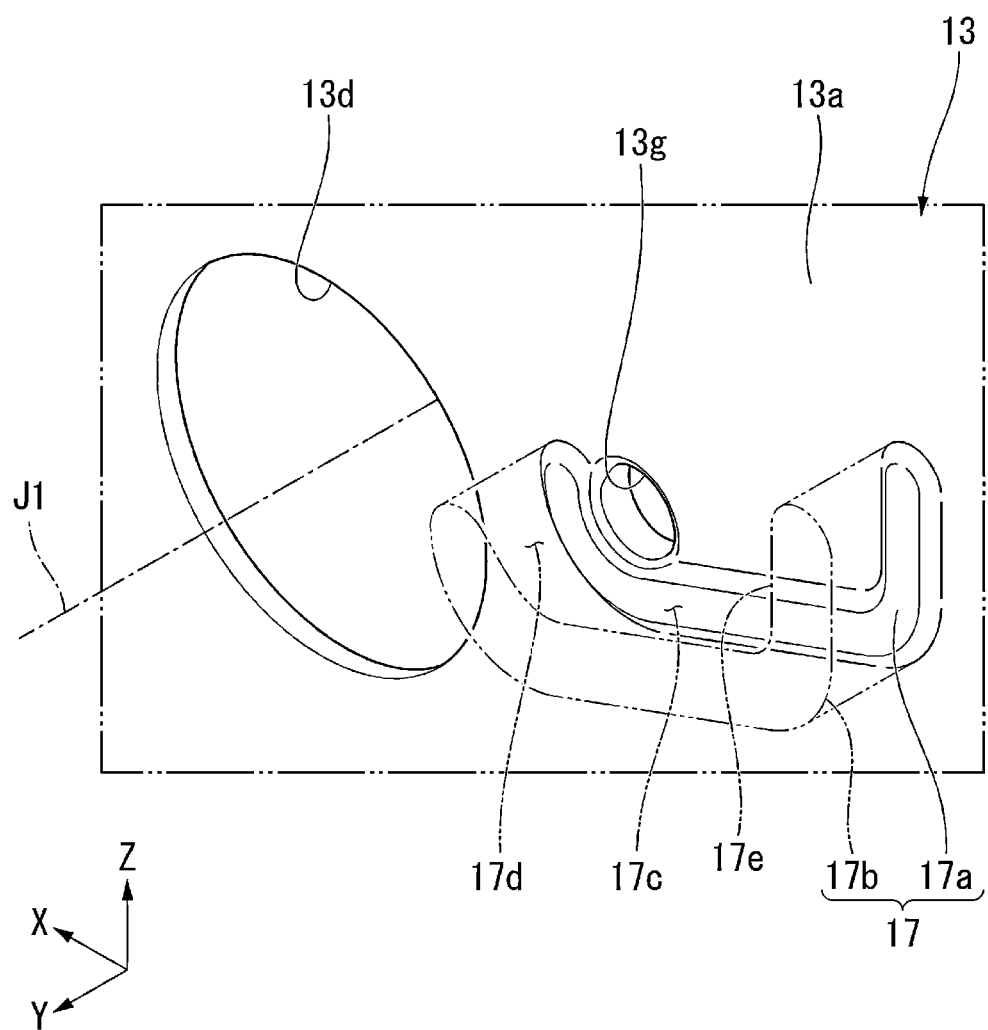
FIG. 8 is a perspective view illustrating a first gutter portion of an embodiment.

The housing 10 has a first gutter portion 17. The first gutter portion 17 is positioned axially between the first facing wall portion 13a and the second facing wall portion 15a. That is, the first gutter portion 17 is positioned in the space S. As illustrated in FIG. 8, the first gutter portion 17 has a gutter shape opening upward and extending in the axial direction. The oil O flows through in the first gutter portion 17. The first gutter portion 17 is a reservoir capable of internally storing the oil O. In the present embodiment, the first gutter portion 17 is positioned on the rear side (−X side) relative to the central axis J1. The first gutter portion 17 is positioned rearward the hole 13d.

The first gutter portion 17 joins the first facing wall portion 13a and the second facing wall portion 15a. In the present embodiment, the first gutter portion 17 has a first part 17a protruding to axial one side from the surface on axial one side (+Y side) of the first facing wall portion 13a, and a second part 17b protruding to the axial other side from the surface on the axial other side (−Y side) of the second facing wall portion 15a. The end part on axial one side of the first part 17a and the end part on the axial other side of the second part 17b are joined to each other. The axial dimension of the second part 17b is larger than the axial dimension of the first part 17a.

The first gutter portion 17 has a bottom surface 17c facing upward, and a pair of side surfaces 17d and 17e protruding upward from both sides in the front-rear direction of the bottom surface 17c. The bottom surface 17c and the pair of side surfaces 17d and 17e extend in the axial direction. The bottom surface 17c and the pair of side surfaces 17d and 17e join the first facing wall portion 13a and the second facing wall portion 15a. The pair of side surfaces 17d and 17e are arranged to face each other at an interval in the axial direction. The side surface 17d is positioned on the front side (+X side) of the side surface 17e.

The bottom surface 17c is inclined in the vertical direction with respect to the front-rear direction. The bottom surface 17c is positioned downward toward the front side (+X side). In the present embodiment, the bottom surface 17c is an inclined surface positioned downward toward a first hole part 13g provided on the first facing wall portion 13a. Therefore, the oil O in the first gutter portion 17 is easily guided into the first hole part 13g along the bottom surface 17c using gravity. The first hole part 13g axially penetrates the first facing wall portion 13a. The first hole part 13g is, for example, a circular hole. The first hole part 13g opens at the front end part of the inside of the first gutter portion 17. The first hole part 13g is joined to the bottom surface 17c and the side surface 17d.

As illustrated in FIG. 5, the first gutter portion 17 is joined to a part positioned on the lower side of the first hole part 13g of the surface on axial one side of the first facing wall portion 13a and a part positioned on the lower side of a second hole part 15g of the surface on the axial other side of the second facing wall portion 15a. The second hole part 15g axially penetrates the second facing wall portion 15a. The second hole part 15g is, for example, a circular hole. The second hole part 15g opens at the end part on the rear side (−X side) of the inside of the first gutter portion 17 and the end part on the front side (+X side) of the inside of a second gutter portion 18.

Figure 9:
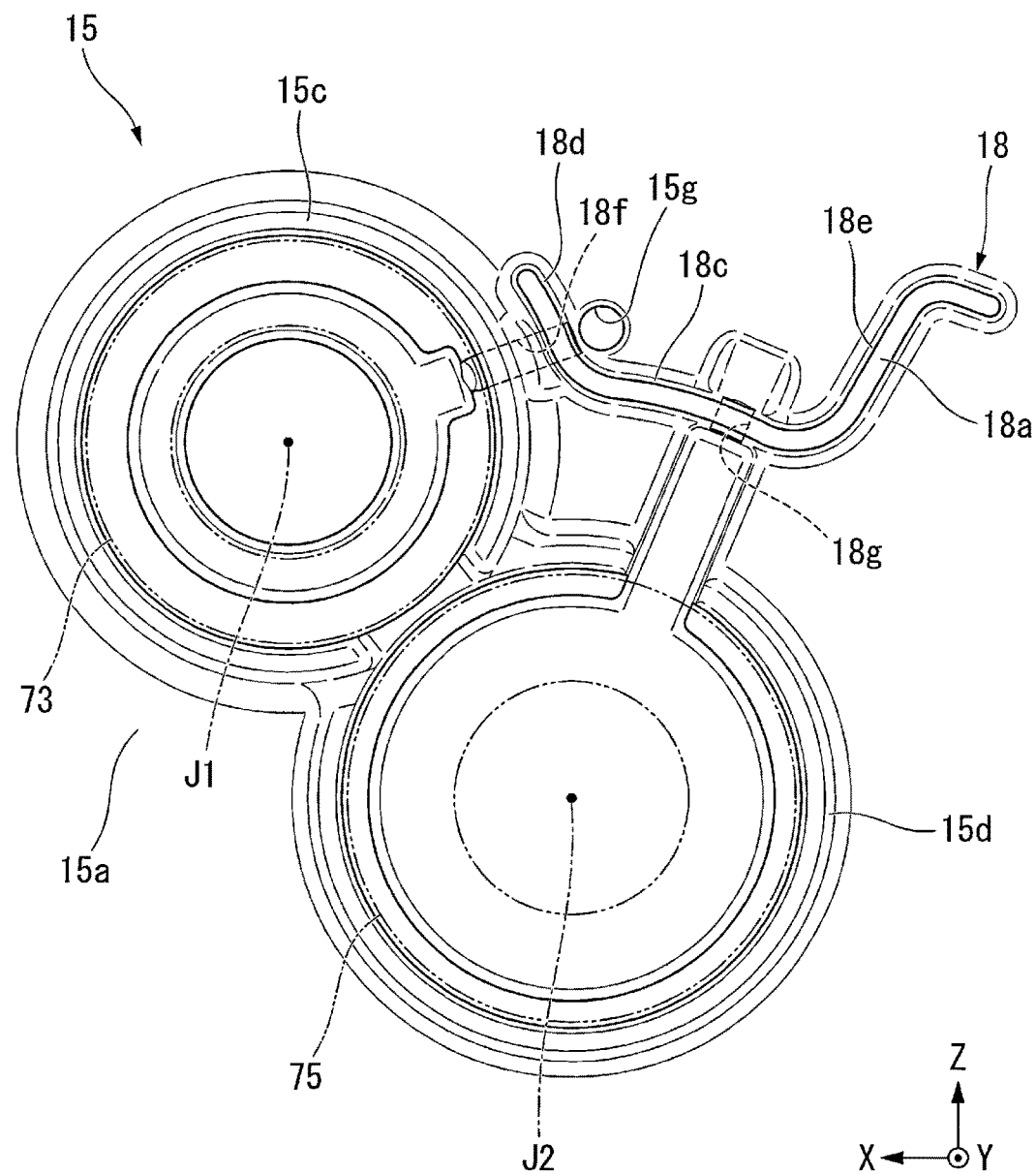
FIG. 9 is a view of a second gutter portion of an embodiment as viewed from an axial one side.

As illustrated in FIG. 2, the housing 10 has the second gutter portion 18. The second gutter portion 18 is positioned inside the transmission mechanism housing 12. As illustrated in FIGS. 5 and 9, the second gutter portion 18 has a gutter shape opening upward and extending in the axial direction. The oil O flows through in the second gutter portion 18. The second gutter portion 18 is a reservoir capable of internally storing the oil O. In the present embodiment, the second gutter portion 18 is positioned on the rear side (−X side) relative to the central axis J1. The second gutter portion 18 is positioned on the upper side of the bearing holding portion 15d. As illustrated in FIG. 5, the end part on the front (+X side) side of the second gutter portion 18 is positioned on axial one side (+Y side) of the end part of the rear side of the first gutter portion 17.

As illustrated in FIG. 2, the second gutter portion 18 joins the second facing wall portion 15a and the lid wall portion 16a. In the present embodiment, the second gutter portion 18 has a first part 18a protruding to axial one side from the surface on axial one side (+Y side) of the second facing wall portion 15a, and a second part 18b protruding to the axial other side from the surface on the axial other side (−Y side) of the lid wall portion 16a. The end part on axial one side of the first part 18a and the end part on the axial other side of the second part 18b are joined to each other.

As illustrated in FIG. 9, the second gutter portion 18 has a bottom surface 18c facing upward, and a pair of side surfaces 18d and 18e protruding upward from both sides in the front-rear direction of the bottom surface 18c. The bottom surface 18c and the pair of side surfaces 18d and 18e extend in the axial direction. The bottom surface 18c and the pair of side surfaces 18d and 18e join the second facing wall portion 15a and the lid wall portion 16a. The pair of side surfaces 18d and 18e are arranged to face each other at an interval in the axial direction.

The side surface 18d is positioned on the front side (+X side) of the side surface 18e. The side surface 18d is inclined in the front-rear direction with respect to the vertical direction. The side surface 18d is positioned on the front side (+X side) toward the upper side. In the present embodiment, the side surface 18d is an inclined surface positioned downward toward the second hole part 15g. Therefore, the oil O having entered the second gutter portion 18 is easily guided into the second hole part 15g along the side surface 18d using gravity.

The side surface 18e is inclined in the front-rear direction with respect to the vertical direction. The side surface 18d is positioned on the rear side (−X side) toward the upper side. The bottom surface 18c is inclined in the vertical direction with respect to the front-rear direction. The bottom surface 18c is positioned downward toward the rear side (−X side).

As illustrated in FIG. 5, the second gutter portion 18 is joined to a part positioned on the lower side of the second hole part 15g of the surface on axial one side of the second facing wall portion 15a. The second gutter portion 18 is provided with supply hole parts 18f and 18g. The supply hole part 18f joins the inside of the second gutter portion 18 and the inside of the bearing holding portion 15c. Therefore, part of the oil O having entered the second gutter portion 18 is supplied to the bearing 73 in the bearing holding portion 15c via the supply hole part 18f. As illustrated in FIG. 9, the supply hole part 18f opens to the side surface 18d. The supply hole part 18f extends forward (+X side) and obliquely downward from the side surface 18d.

The supply hole part 18g joins the inside of the second gutter portion 18 and the inside of the bearing holding portion 15d. Therefore, part of the oil O having entered the second gutter portion 18 is supplied to the bearing 75 in the bearing holding portion 15d via the supply hole part 18g. The supply hole part 18g is open to the bottom surface 18c. The supply hole part 18g extends downward and obliquely forward (+X side) from the bottom surface 18c.

As illustrated in FIG. 2, the housing 10 includes a first flow path 90 and the second flow path 50. The first flow path 90 is a flow path through which the oil O as a first fluid flows. The second flow path 50 is a flow path through which the water W as a second fluid flows.

In the present description, the "flow path" means a route through which a fluid flows. Therefore, the concept of "flow path" includes not only a "flow path" in which a steady flow of a fluid in one direction is generated, but also a route in which the fluid is caused to temporarily stay, and also a route along which the fluid drips. Examples of the route in which the fluid is caused to temporarily stay include a reservoir or the like that stores the fluid.

The first flow path 90 includes a first supply flow path 91, the second supply flow path 92, and the collection flow path 93. The first supply flow path 91 and the second supply flow path 92 are supply flow paths for supplying the oil O in the transmission mechanism housing 12 to the inside of the motor housing 11.

The first supply flow path 91 includes a bringing up flow path 91a, a shaft supply flow path 91b, an in-shaft flow path 91c, and an in-rotor flow path 90a. The bringing up flow path 91a is a route through which the oil O in the transmission mechanism housing 12 is brought up by the rotation of the ring gear 62a of the differential device 62 and enters the second gutter portion 18. The shaft supply flow path 91b is a route through which the oil O in the second gutter portion 18 flows into the bearing holding portion 16c through a flow path not illustrated provided in the lid wall portion 16a and flows into the shaft 31 from the bearing holding portion 16c.

When the oil O flows into the bearing holding portion 16c in the shaft supply flow path 91b, the oil O is supplied to the bearing 74 held by the bearing holding portion 16c. In the shaft supply flow path 91b of the present embodiment, the oil O flows in from the end part on axial one side of the shaft 31.

The in-shaft flow path 91c is a route through which the oil O having flowed into the shaft 31 from the end part on axial one side of the shaft 31 flows inside the shaft 31 to the axial other side. The in-rotor flow path 90a is a route for the oil O in the shaft 31 to pass through the inside of the rotor body 32 from the hole part 33 and to be scattered to the stator 40. In this manner, the oil O is supplied to the rotor 30 and the stator 40 by the first supply flow path 91.

As illustrated in FIG. 1, the second supply flow path 92 includes an introduction flow path portion 92a, a coupling flow path portion 92b, an in-shaft flow path portion 92c, and the in-rotor flow path 90a. The introduction flow path portion 92a extends in the axial direction from the inside of the transmission mechanism housing 12. More specifically, the introduction flow path portion 92a extends to the axial other side from the inside of the transmission mechanism housing 12, passes through the second facing wall portion 15a, the first facing wall portion 13a, and the peripheral wall portion 13b, and extends to the second housing member 14. The oil O sucked from the inside of the transmission mechanism housing 12 by the pump 94 flows into the introduction flow path portion 92a. In the introduction flow path portion 92a, the oil O flows to the axial other side.

As illustrated in FIG. 3, a flow path cross section of the introduction flow path portion 92a has an oval shape elongated in the circumferential direction. The circumferential dimension of the introduction flow path portion 92a is smaller than the circumferential dimension of the collection flow path body portion 93c described later, the circumferential dimension of a first circumferential flow path portion 52a described later, and the circumferential dimension of the second circumferential flow path portion 52b described later. Therefore, the circumferential dimension of the introduction flow path portion 92a can be made relatively small. This can reduce the pressure loss generated in the oil O flowing through in the introduction flow path portion 92a. Therefore, the oil O can be easily fed into the introduction flow path portion 92a by the pump 94.

For example, the introduction flow path portion 92a is positioned on the forward (+X side) and downward relative to the central axis J1. At least a part of the introduction flow path portion 92a is positioned radially outside the second flow path 50. In the present embodiment, substantially the entire introduction flow path portion 92a excluding axial both end parts is positioned radially outside the second flow path 50. The introduction flow path portion 92a is positioned downward the second flow path 50.

As illustrated in FIG. 1, the coupling flow path portion 92b is provided on the lid wall portion 14a of the second housing member 14. The coupling flow path portion 92b extends upward from the end part on the axial other side of the introduction flow path portion 92a, and is joined to the recess part 14c. Due to this, the oil O flows into the recess part 14c. Part of the oil O having flowed into the recess part 14c is supplied to the bearing 71 held by the bearing holding portion 14d. Other part of the oil O having flowed into the recess part 14c flows into the shaft 31 from the axial other side. The in-shaft flow path 92c is a route through which the oil O having flowed into the shaft 31 from the end part on the axial other side of the shaft 31 flows to axial one side in the shaft 31. In this manner, in the present embodiment, the oil O flows into the shaft 31 from axial both sides by the first supply flow path 91 and the second supply flow path 92. Therefore, for example, as compared with the case where the oil O flows in only from one end part in the shaft 31, it is possible to suitably flow the oil O to the entire shaft 31 in the axial direction. That is, it is possible to suppress that the oil O having flowed in from one end part in the shaft 31 does not reach the other end part in the shaft 31 and does not spread to the entire inside of the shaft 31. Therefore, it is easy to suitably supply the oil O to each of the bearings 71 and 74 supporting the axial both end parts of the shaft 31. The oil O flowing through the in-shaft flow path 92c flows through the in-rotor flow path 90a, similarly to the in-shaft flow path 91c, and is supplied to the rotor 30 and the stator 40.

The oil O having been supplied to the stator 40 takes heat from the stator 40 by the first supply flow path 91 and the second supply flow path 92. The oil O having cooled the stator 40 drops downward and accumulates in a lower region in the motor housing 11. The oil O accumulated in the lower region in the motor housing 11 returns to the inside of the transmission mechanism housing 12 via the through hole 19a of the division wall portion 19 or the collection flow path 93.

As illustrated in FIG. 2, the collection flow path 93 extends from the inside of the motor housing 11 to the inside of the transmission mechanism housing 12. In the present embodiment, the collection flow path 93 is provided across the third housing member 15, the first housing member 13, and the second housing member 14. The collection flow path 93 is positioned downward the rotor 30 and the stator 40. The collection flow path 93 includes the groove portion 93a, the connection portion 93b, and the collection flow path body portion 93c. The groove portion 93a is provided on the inner peripheral face of the motor housing 11. In the present embodiment, the groove portion 93a is recessed downward from a part positioned downward of the inner peripheral face of the first housing member 13. The groove portion 93a extends in the axial direction. The end part on axial one side of the groove portion 93a is closed. The end part on the axial other side of the groove portion 93a is open to the end surface on the axial other side of the peripheral wall portion 13b. The end part on the axial other side of the groove portion 93a is joined to the connection portion 93b.

Figure 10:
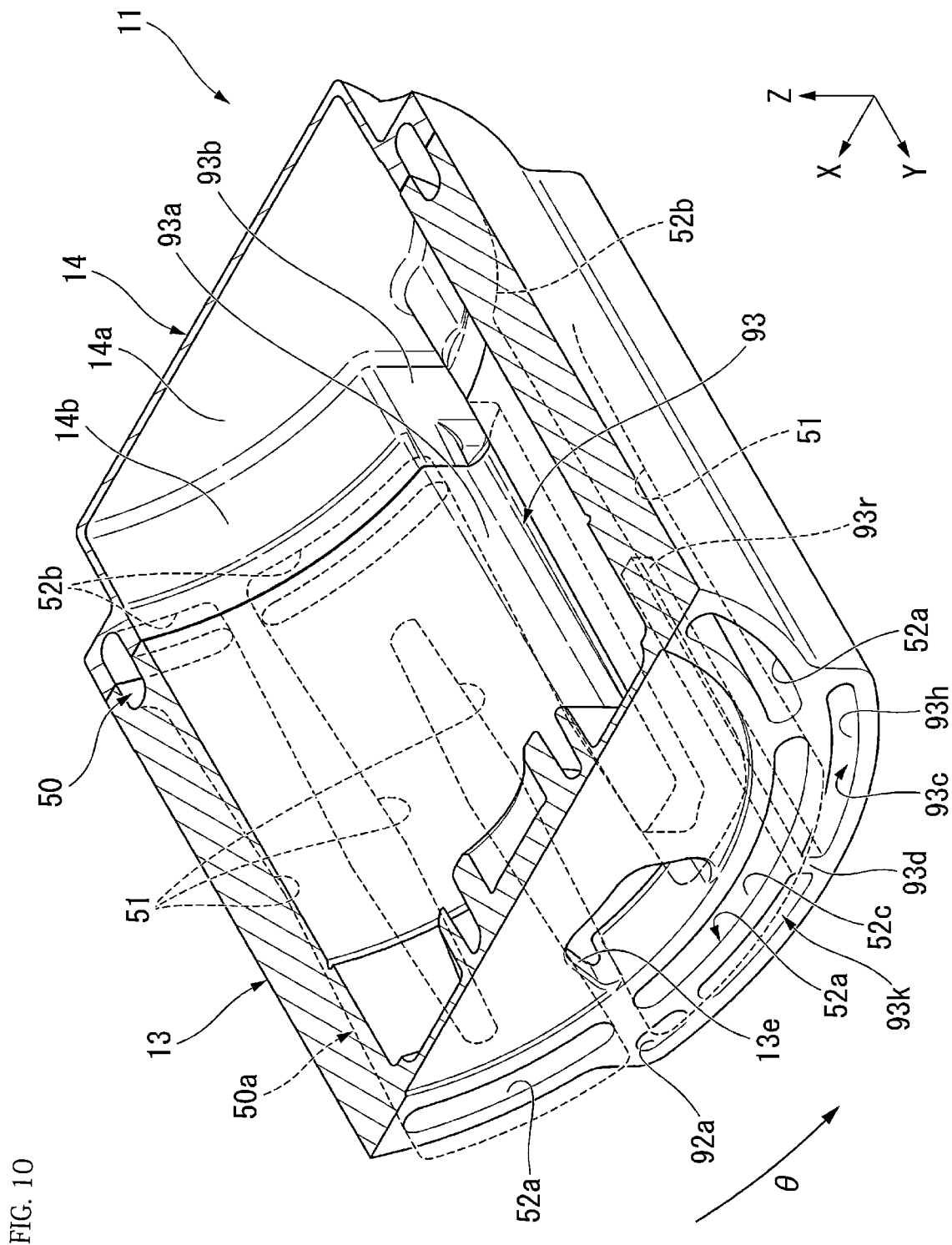
FIG. 10 is a cross-sectional perspective view illustrating a part of the motor housing of an embodiment.

The bottom surface of the groove portion 93a is positioned downward toward the axial other side. That is, the bottom surface of the groove portion 93a is an inclined surface positioned downward toward the connection portion 93b. Therefore, the oil O having entered the groove portion 93a can be easily guided to the connection portion 93b along the bottom surface of the groove portion 93a using gravity. The bottom surface of the groove portion 93a is a surface of the inner surface of the groove portion 93a positioned radially outside and facing radially inside. In the present embodiment, the bottom surface of the groove portion 93a faces upward. As illustrated in FIG. 10, the circumferential dimension of the groove portion 93a is smaller than the circumferential dimension of the through hole 13e.

The connection portion 93b joins the groove portion 93a and the collection flow path body portion 93c. The connection portion 93b is joined to an end part 93f on the axial other side of the groove portion 93a. In the present embodiment, the connection portion 93b is provided on the peripheral wall portion 14b of the second housing member 14. The connection portion 93b extends on the lower side from a portion positioned on the lower side of the inner peripheral face of the peripheral wall portion 14b. The connection portion 93b opens upward. As illustrated in FIG. 2, the end part on the lower side of the connection portion 93b is joined to an end part 93g on the axial other side of the collection flow path body portion 93c. Due to this, the connection portion 93b joins the end part 93f on the axial other side of the groove portion 93a and the end part 93g on the axial other side of the collection flow path body portion 93c.

The collection flow path body portion 93c is positioned radially outside the groove portion 93a. In the present embodiment, the collection flow path body portion 93c is positioned downward the groove portion 93a. The collection flow path body portion 93c extends in the axial direction and is joined to the inside of the transmission mechanism housing 12. An end part 93p on axial one side of the collection flow path body portion 93c is open to the inside of the transmission mechanism housing 12. In the present embodiment, the collection flow path body portion 93c is provided across the second housing member 14, the first housing member 13, and the third housing member 15. That is, the collection flow path body portion 93c includes a first part 93h provided in the first housing member 13, a second part 93i provided in the second housing member 14, and a third part 93j provided in the third housing member 15. An end part 93k on axial one side of the first part 93h is joined to the end part on the axial other side of the third part 93j. An end part 93m on the axial other side of the first part 93h is joined to the end part on axial one side of the second part 93i. The collection flow path body portion 93c extends to axial one side from the end part on the lower side of the connection portion 93b, axially penetrates the first housing member 13 and the third housing member 15, and is open to the inside of the transmission mechanism housing 12. The collection flow path body portion 93c is positioned on the lower side relative to the through hole 19a of the division wall portion 19.

As illustrated in FIGS. 3 and 4, the flow path cross section of the collection flow path body portion 93c has a shape elongated in the circumferential direction. The circumferential dimension of the collection flow path body portion 93c is larger than the circumferential dimension of the groove portion 93a and the circumferential dimension of the connection portion 93b. Therefore, it is possible to increase the flow rate of the oil O that can flow into the collection flow path body portion 93c. Due to this, it is possible to increase the amount of the oil O that can be returned from the inside of the motor housing 11 into the transmission mechanism housing 12.

At least a part of the collection flow path body portion 93c is positioned radially outside the second flow path 50. Due to this, at least a part of the collection flow path 93 is positioned radially outside the second flow path 50. As illustrated in FIG. 10, a part of the collection flow path body portion 93c is positioned downward a pair of axial flow path portions 51 described later arranged circumferentially across the groove portion 93a in the second flow path 50, a first circumferential flow path portion 52c described later positioned on axial one side of the groove portion 93a in the second flow path 50, and a pair of the second circumferential flow path portions 52b described later arranged circumferentially across the connection portion 93b in the second flow path 50. In the present embodiment, since the circumferential dimension of the collection flow path body portion 93c is larger than the circumferential dimension of the groove portion 93a and the circumferential dimension of the connection portion 93b as described above, the collection flow path body portion 93c can circumferentially protrude relative to the groove portion 93a and the connection portion 93b. Therefore, the collection flow path body portion 93c can be easily arranged radially outside the second flow path 50.

The collection flow path body portion 93c is arranged adjacent to circumferential one side (+θ side) of the introduction flow path portion 92a. That is, in the present embodiment, the introduction flow path portion 92a is arranged circumferentially adjacent to the collection flow path 93. In the present embodiment, the part of the motor housing 11 where the collection flow path body portion 93c and the introduction flow path portion 92a are provided protrudes on the lower side relative to the other parts of the motor housing 11.

The collection flow path body portion 93c is provided with a partition wall portion 93d partitioning circumferentially the inside of the collection flow path body portion 93c. The partition wall portion 93d extends in the axial direction from the end part 93p on axial one side of the first part 93h toward the axial other side. In the present embodiment, the partition wall portion 93d extends from the end part 93k on axial one side of the first part 93h to the axial center part of the first part 93h. In other words, the partition wall portion 93d extends from the end part on axial one side of the first housing member 13 to the axial center part of the first housing member 13. The partition wall portion 93d divides the collection flow path body portion 93c, which is circumferentially long, into substantially two equal parts in the circumferential direction. The partition wall portion 93d can improve the strength of the part of the housing 10 where the collection flow path body portion 93c is provided. The axial force of the bolt 10b can be more suitably transmitted to the first housing member 13 and the third housing member 15.

The partition wall portion 93d needs not extend to the axial center part of the first part 93h, i.e., the axial center part of the first housing member 13. For example, an end part 93r on the axial other side of the partition wall portion 93d may be arranged at any position as long as it is positioned on the axial other side relative to the end part 93k on axial one side of the first part 93h and positioned on axial one side relative to the end part 93m on the axial other side of the first part 93h.

As illustrated in FIG. 3, the collection flow path body portion 93c has a recessed portion 93e recessed radially inward. The recessed portion 93e is positioned at the circumferential center part of the axial other side part of the collection flow path body portion 93c. An outer peripheral face of the part of the motor housing 11 where the recessed portion 93e is provided is recessed radially inward. Due to this, for example, the bolt 10b for fixing the first housing member 13 and the third housing member 15 can be suppressed from interfering with the collection flow path body portion 93c.

Figure 11:
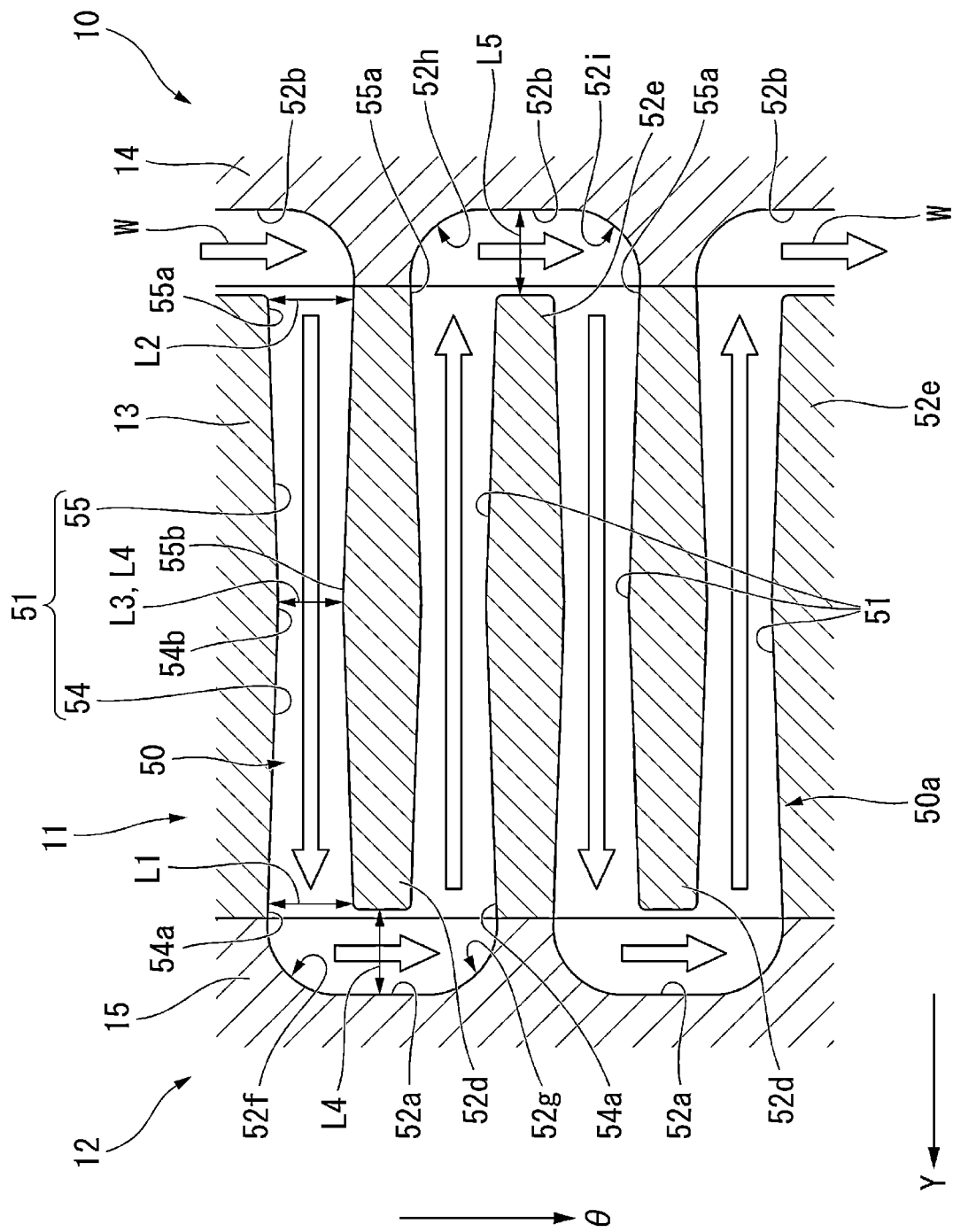
FIG. 11 is a cross-sectional view illustrating a part of a second flow path of an embodiment.

As illustrated in FIGS. 1 and 2, at least a part of the second flow path 50 is positioned radially outside the stator 40. In the present embodiment, substantially the entire second flow path 50 excluding axial both end parts is positioned radially outside the stator 40. A part of the second flow path 50 positioned downward is positioned radially between the collection flow path body portion 93c and the stator 40. As illustrated in FIGS. 10 and 11, in the present embodiment, the second flow path 50 is a flow path extending in a rectangular wave shape along the circumferential direction. The second flow path 50 includes a plurality of the axial flow path portions 51, a plurality of the first circumferential flow path portions 52a, and a plurality of the second circumferential flow path portions 52b. The plurality of axial flow path portions 51, the plurality of first circumferential flow path portions 52a, and the plurality of second circumferential flow path portions 52b constitute a second flow path body 50a extending in a rectangular wave shape along the circumferential direction.

The plurality of axial flow path portions 51 extend in the axial direction. The plurality of axial flow path portions 51 are arranged at intervals in the circumferential direction. In the present embodiment, the axial flow path portion 51 is provided in the motor housing 11. More specifically, the axial flow path portion 51 is provided in the first housing member 13. As illustrated in FIG. 10, the two axial flow path portions 51 positioned downward among the plurality of axial flow path portions 51 are arranged circumferentially across the groove portion 93a.

As illustrated in FIG. 11, each of the axial flow path portions 51 includes a first flow path portion 54 having a first end part 54a on axial one side (+Y side of the axial flow path portion 51, and a second flow path portion 55 having a second end part 55a on the axial other side (-Y side) of the axial flow path portion 51. The first flow path portion 54 is a part of the axial flow path portion 51 on axial one side. The second flow path portion 55 is a part of the axial flow path portion 51 on the axial other side. The second flow path portion 55 is joined to the axial other side of the first flow path portion 54. In the present embodiment, a third end part 54b on the axial other side of the first flow path portion 54 and a fourth end part 55b on the axial one side of the second flow path portion 55 are joined to each other at the axial center part of the axial flow path portion 51. The third end part 54b is an end part of the first flow path portion 54 on a side close to the second flow path portion 55. The fourth end part 55b is an end part of the second flow path portion 55 on a side close to the first flow path portion 54. In the present embodiment, the axial dimension of the first flow path portion 54 and the axial dimension of the second flow path portion 55 are the same.

The circumferential dimension of the first flow path portion 54 decreases toward the axial other side (-Y side) from the first end part 54a to the third end part 54b. That is, the circumferential dimension of the first flow path portion 54 decreases toward the second flow path portion 55. Side surfaces of the inner surface of the first flow path portion 54 positioned on circumferential both sides circumferentially approach each other toward the second flow path portion 55. The side surfaces of the inner surface of the first flow path portion 54 positioned on circumferential both sides extend linearly and obliquely with respect to the axial direction. A circumferential dimension L1 of the first end part 54a is larger than a circumferential dimension L3 of the third end part 54b. The ratio of the dimension L3 to the dimension L1 is not particularly limited, but is, for example, about 0.8 or more and 0.95 or less. As illustrated in FIG. 1, in the present embodiment, the radial dimension of the first flow path portion 54 is the same over the entire axial direction.

The flow path cross-sectional area in the first flow path portion 54 decreases toward the axial other side (-Y side) from the first end part 54a to the third end part 54b. That is, the flow path cross-sectional area in the first flow path portion 54 decreases toward the second flow path portion 55. The flow path cross-sectional area at the first end part 54a is larger than the flow path cross-sectional area at the third end part 54b. The ratio of the flow path cross-sectional area at the third end part 54b to the flow path cross-sectional area at the first end part 54a is not particularly limited, but is, for example, about 0.8 or more and 0.95 or less. In the present description, the "flow path cross-sectional area" is an area of the flow path in a cross section orthogonal to the direction in which the flow path extends.

As illustrated in FIG. 11, the circumferential dimension of the second flow path portion 55 decreases toward axial one side (+Y side) from the second end part 55a to the fourth end part 55b. That is, the circumferential dimension of the second flow path portion 55 decreases toward the first flow path portion 54. Side surfaces of the inner surface of the second flow path portion 55 positioned on circumferential both sides circumferentially approach each other toward the first flow path portion 54. The side surfaces of the inner surface of the second flow path portion 55 positioned on circumferential both sides extend linearly and obliquely with respect to the axial direction. A circumferential dimension L2 of the second end part 55a is larger than a circumferential dimension L4 of the fourth end part 55b. The ratio of the dimension L4 to the dimension L2 is not particularly limited, but is, for example, about 0.8 or more and 0.95 or less. As illustrated in FIG. 1, in the present embodiment, the radial dimension of the second flow path portion 55 is the same over the entire axial direction.

The flow path cross-sectional area in the second flow path portion 55 decreases toward axial one side (+Y side) from the second end part 55a to the fourth end part 55b. That is, the flow path cross-sectional area in the second flow path portion 55 decreases toward the first flow path portion 54. The flow path cross-sectional area at the second end part 55a is larger than the flow path cross-sectional area at the fourth end part 55b. The ratio of the flow path cross-sectional area at the fourth end part 55b to the flow path cross-sectional area at the second end part 55a is not particularly limited, but is, for example, about 0.8 or more and 0.95 or less.

As illustrated in FIG. 11, in the present embodiment, the circumferential dimension L1 of the first end part 54a and the circumferential dimension L2 of the second end part 55a are the same. The circumferential dimension L3 of the third end part 54b and the circumferential dimension L4 of the fourth end part 55b are the same. In the present embodiment, the flow path cross-sectional area at the first end part 54a and the flow path cross-sectional area at the second end part 55a are the same. The flow path cross-sectional area at the third end part 54b and the flow path cross-sectional area at the fourth end part 55b are the same.

The first circumferential flow path portion 52a and the second circumferential flow path portion 52b extend in the circumferential direction. The plurality of first circumferential flow path portions 52a are arranged at intervals in the circumferential direction. The plurality of second circumferential flow path portions 52b are arranged at intervals in the circumferential direction. The first circumferential flow path portion 52a joins the first end parts 54a on axial one side of the axial flow path portions 51 circumferentially adjacent to each other. The second circumferential flow path portion 52b joins the second end parts 55a on the axial other side of the axial flow path portions 51 circumferentially adjacent to each other. The end parts on axial both sides of the axial flow path portions 51 are alternately joined by the first circumferential flow path portion 52a and the second circumferential flow path portion 52b, so that the second flow path 50 has a rectangular wave shape.

In the present embodiment, corner portions 52f and 52g where the first circumferential flow path portion 52a and the axial flow path portion 51 are joined and corner portions 52h and 52i where the second circumferential flow path portion 52b and the axial flow path portion 51 are joined have arc shapes. The corner portion 52f is a corner portion where the end part on the circumferential other side (-θ side) of the first circumferential flow path portion 52a and the first end part 54a are joined. The corner portion 52g is a corner portion where the end part on circumferential one side (+θ side) of the first circumferential flow path portion 52a and the first end part 54a are joined. The corner portion 52h is a corner portion where the end part on the circumferential other side (−θ side) of the second circumferential flow path portion 52b and the second end part 55a are joined. The corner portion 52i is a corner portion where the end part on circumferential one side (+θ side) of the second circumferential flow path portion 52b and the second end part 55a are joined. The first circumferential flow path portion 52a joins the first end parts 54a of the axial flow path portions 51 circumferentially adjacent to each other via the corner portions 52f and 52g. The second circumferential flow path portion 52b joins the second end parts 55a of the axial flow path portions 51 circumferentially adjacent to each other via the corner portions 52h and 52i.

Of the inner surfaces of the corner portions 52f and 52g, the surface positioned outside has an arc shape in which the radius of curvature becomes half or more of the circumferential dimension L1 of the first end part 54a as viewed in the radial direction. Of the inner surfaces of the corner portions 52h and 52i, the surface positioned outside has an arc shape in which the radius of curvature becomes half or more of the circumferential dimension L2 of the second end part 55a as viewed in the radial direction. Of the inner surfaces of the corner portions 52f, 52g, 52h, and 52i, the radii of curvature of the surface positioned outside are, for example, the same.

Of the inner surfaces of the corner portion 52f, the surface positioned outside is a part indicated by the arrow indicating the corner portion 52f in FIG. 11, and is a surface positioned on axial one side (+Y side) and the circumferential other side (−θ side) of the inner surface of the corner portion 52f. Of the inner surfaces of the corner portion 52g, the surface positioned outside is a part indicated by the arrow indicating the corner portion 52g in FIG. 11, and is a surface positioned on axial one side (+Y side) and circumferential one side (+θ side) of the inner surface of the corner portion 52g. Of the inner surfaces of the corner portion 52h, the surface positioned outside is a part indicated by the arrow indicating the corner portion 52h in FIG. 11, and is a surface positioned on the axial other side (−Y side) and the circumferential other side (−θ side) of the inner surface of the corner portion 52h. Of the inner surfaces of the corner portion 52i, the surface positioned outside is a part indicated by the arrow indicating the corner portion 52i in FIG. 11, and is a surface positioned on the axial other side (−Y side) and circumferential one side (+θ side) of the inner surface of the corner portion 52i.

In the present embodiment, an axial dimension L4 of the first circumferential flow path portion 52a and an axial dimension L5 of the second circumferential flow path portion 52b are the same. A difference between the circumferential dimension L1 of the first end part 54a and the axial dimension L4 of the first circumferential flow path portion 52a is equal to or less than a difference between the circumferential dimension L1 of the first end part 54a and the circumferential dimension L3 of the third end part 54b. In the present embodiment, the circumferential dimension L1 of the first end part 54a and the axial dimension L4 of the first circumferential flow path portion 52a are the same. A difference between the circumferential dimension L2 of the second end part 55a and the axial dimension L5 of the second circumferential flow path portion 52b is equal to or less than a difference between the circumferential dimension L2 of the second end part 55a and the circumferential dimension L4 of the fourth end part 55b. In the present embodiment, the circumferential dimension L2 of the second end part 55a and the axial dimension L5 of the second circumferential flow path portion 52b are the same.

In the present embodiment, the axial dimension L4 of the first circumferential flow path portion 52a is a distance in the axial direction between the end surface on axial one side (+Y side) of a partition wall portion 52d partitioning the axial flow path portions 51 circumferentially adjacent to each other and the inner surface of the first circumferential flow path portion 52a arranged to face axial one side of the partition wall portion 52d. The partition wall portion 52d circumferentially partitions the pair of axial flow path portions 51 coupled by the first circumferential flow path portion 52a. The axial dimension L4 of the first circumferential flow path portion 52a is the same throughout the circumferential direction. The radial dimension of the first circumferential flow path portion 52a is the same throughout the circumferential direction. The flow path cross-sectional area of the first circumferential flow path portion 52a is the same throughout the circumferential direction.

In the present embodiment, the axial dimension L5 of the second circumferential flow path portion 52b is a distance in the axial direction between the end surface on the axial other side (−Y side) of a partition wall portion 52e partitioning the axial flow path portions 51 circumferentially adjacent to each other and the inner surface of the second circumferential flow path portion 52b arranged to face the axial other side of the partition wall portion 52e. The partition wall portion 52e circumferentially partitions the pair of axial flow path portions 51 coupled by the second circumferential flow path portion 52b. The axial dimension L5 of the second circumferential flow path portion 52b is the same throughout the circumferential direction. The radial dimension of the second circumferential flow path portion 52b is the same throughout the circumferential direction. The flow path cross-sectional area of the second circumferential flow path portion 52b is the same throughout the circumferential direction. In the present embodiment, the flow path cross-sectional area of the first circumferential flow path portion 52a and the flow path cross-sectional area of the second circumferential flow path portion 52b are the same.

The difference between the flow path cross-sectional area at the first end part 54a and the flow path cross-sectional area at the first circumferential flow path portion 52a is equal to or less than the difference between the flow path cross-sectional area at the first end part 54a and the flow path cross-sectional area at the third end part 54b. In the present embodiment, the flow path cross-sectional area at the first end part 54a and the flow path cross-sectional area at the first circumferential flow path portion 52a are the same.

The difference between the flow path cross-sectional area at the second end part 55a and the flow path cross-sectional area at the second circumferential flow path portion 52b is equal to or less than the difference between the flow path cross-sectional area at the second end part 55a and the flow path cross-sectional area at the fourth end part 55b. In the present embodiment, the flow path cross-sectional area at the second end part 55a and the flow path cross-sectional area at the second circumferential flow path portion 52b are the same.

As illustrated in FIG. 10, the plurality of first circumferential flow path portions 52a include the first circumferential flow path portion 52c circumferentially straddling axial one side of the groove portion 93a. The first circumferential flow path portion 52c is the first circumferential flow path portion 52a positioned on the lowermost side among the plurality of first circumferential flow path portions 52a. The circumferential dimension of the first circumferential flow path portion 52c is larger than the circumferential dimension of the other first circumferential flow path portions 52a. The through hole 13e is positioned on the upper side of the circumferential other side (−θ side) part of the first circumferential flow path portion 52c.

The plurality of second circumferential flow path portions 52b include the pair of second circumferential flow path portions 52b circumferentially sandwiching the end part on the axial other side of the groove portion 93a and the connection portion 93b. That is, in the present embodiment, the end part on the axial other side of the groove portion 93a and the connection portion 93b are positioned between the second circumferential flow path portions 52b circumferentially adjacent to each other.

As illustrated in FIG. 11, in the present embodiment, the first circumferential flow path portion 52a is provided across the motor housing 11 and the transmission mechanism housing 12. More specifically, the first circumferential flow path portion 52a is provided across the first housing member 13 and the third housing member 15. The first circumferential flow path portion 52a is configured by axially coupling a part provided on the end surface on axial one side of the first housing member 13 and a groove recessed to axial one side from the end surface on the axial other side of the third housing member 15.

In the present embodiment, the second circumferential flow path portion 52b is provided across the first housing member 13 and the second housing member 14. That is, in the present embodiment, the second flow path 50 is provided across the first housing member 13 and the second housing member 14. The second circumferential flow path portion 52b is configured by axially coupling a part provided on the end surface on the axial other side of the first housing member 13 and a groove recessed to the axial other side from the end surface on axial one side of the second housing member 14.

The end part on axial one side of the partition wall portion 52d circumferentially partitioning the pair of axial flow path portions 51 coupled by the first circumferential flow path portion 52a is arranged away on the axial other side relative to the end surface on axial one side of the first housing member 13. The end part on the axial other side of the partition wall portion 52e circumferentially partitioning the pair of axial flow path portions 51 coupled by the second circumferential flow path portion 52b is arranged away on axial one side relative to the end surface on the axial other side of the first housing member 13.

In the axial flow path portion 51, the water W flows in the axial direction. The orientations in which the water W flows in the axial flow path portions 51 circumferentially adjacent to each other are opposite to each other. In the first circumferential flow path portion 52a and the second circumferential flow path portion 52b, the water W flows toward circumferential one side (+θ orientation). The first circumferential flow path portion 52a joins the first end part 54a on axial one side of the axial flow path portion 51 through which the water W flows toward axial one side and the first end part 54a on axial one side of the axial flow path portion 51 through which the water W flows toward the axial other side. The second circumferential flow path portion 52b joins the second end part 55a on the axial other side of the axial flow path portion 51 through which the water W flows toward the axial other side and the second end part 55a on the axial other side of the axial flow path portion 51 through which the water W flows toward the axial one side.

As illustrated in FIG. 1, the second flow path 50 includes an upstream flow path portion 51a and a downstream flow path portion 51b. The upstream flow path portion 51a and the downstream flow path portion 51b are partitioned in the axial direction by a partition wall portion 51d. The upstream flow path portion 51a is positioned on axial one side relative to the partition wall portion 51d. The downstream flow path portion 51b is positioned on the axial other side relative to the partition wall portion 51d. The upstream flow path portion 51a and the downstream flow path portion 51b extend in the axial direction.

Although not illustrated, the shape of the upstream flow path portion 51a is similar to the shape of the first flow path portion 54. The shape of the downstream flow path portion 51b is similar to the shape of the second flow path portion 55. The upstream flow path portion 51a is arranged between the first flow path portions 54 in the pair of axial flow path portions 51 circumferentially adjacent to each other. The end part on axial one side (+Y side) of the upstream flow path portion 51a is joined to an end part on the upstream side of the second flow path body 50a. The downstream flow path portion 51b is arranged between the second flow path portions 55 in the pair of axial flow path portions 51 circumferentially adjacent to each other. The end part on the axial other side (−Y side) of the downstream flow path portion 51b is joined to an end part on the downstream side of the second flow path body 50a.

The second flow path 50 includes an inflow flow path portion 53a and an outflow flow path portion 53b. In the present embodiment, the inflow flow path portion 53a and the outflow flow path portion 53b pass through the inside of the inverter unit 80. The water W flows into the inflow flow path portion 53a from the outside of the drive device 100. The water W having flowed into the inflow flow path portion 53a flows into the upstream flow path portion 51a. The water W having flowed into the upstream flow path portion 51a flows around the stator 40 while flowing along the second flow path body 50a having a rectangular wave shape configured by the axial flow path portion 51, the first circumferential flow path portion 52a, and the second circumferential flow path portion 52b, and flows into the outflow flow path portion 53b from the downstream flow path portion 51b. The water W having flowed into the outflow flow path portion 53b flows out of the drive device 100.

As illustrated in FIG. 2, the housing 10 includes an oil supply path 95. The oil supply path 95 extends from the inside of the transmission mechanism housing 12 to axially penetrate the second facing wall portion 15a. In the present embodiment, the oil supply path 95 axially penetrates the first facing wall portion 13a and extends to the inside of the motor housing 11. As illustrated in FIG. 5, the oil supply path 95 has a supply port 13h for supplying the oil O to the bearing 72 held by the bearing holding portion 13c. In the present embodiment, the supply port 13h is an opening part opening on the surface of the first hole part 13g on the axial other side of the first facing wall portion 13a. The supply port 13h is open to the inside of the motor housing 11. As illustrated in FIG. 3, the supply port 13h is positioned on the upper side relative to the central axis J1. The supply port 13h is open to the inside of the penetration portion 13f. As viewed in the axial direction, the supply port 13h overlaps the penetration portion 13f.

In the present embodiment, the oil supply path 95 includes the first hole part 13g, the second hole part 15g, the first gutter portion 17, and the second gutter portion 18. As indicated by the broken arrow in FIG. 5, part of the oil O having been brought up by the ring gear 62a and having entered the second gutter portion 18 passes through the second hole part 15g and flows into the first gutter portion 17 in the space S. The oil O having flowed into the first gutter portion 17 flows through in the first gutter portion 17, passes through the first hole part 13g, and is supplied from the supply port 13h into the motor housing 11. The oil O discharged from the supply port 13h flows into the bearing holding portion 13c via the penetration portion 13f and is supplied to the bearing 72.

According to the present embodiment, at least a part of the second flow path 50 is positioned radially outside the stator 40. Therefore, the stator 40 can be cooled by the water W flowing through in the second flow path 50. At least a part of the collection flow path 93 is positioned radially outside the second flow path 50. Therefore, the collection flow path 93 can be arranged close to the second flow path 50. Due to this, the oil O passing through the collection flow path 93 can be easily cooled by the water W flowing through in the second flow path 50. Therefore, it is possible to lower the temperature of the oil O flowing into the transmission mechanism housing 12 from the collection flow path 93. Therefore, the temperature of the oil O to be supplied from the inside of the transmission mechanism housing 12 to the inside of the motor housing 11 by the first supply flow path 91 and the second supply flow path 92 can be made relatively low. Due to this, the relatively low temperature oil O can be supplied to the rotor 30 and the stator 40 accommodated in the motor housing 11. Therefore, the rotating electrical machine 20 can be suitably cooled by the relatively low temperature oil O. In this manner, in the present embodiment, the rotating electrical machine 20 can be suitably cooled by the water W and the oil O. Therefore, it is possible to improve the cooling efficiency of the rotating electrical machine 20. It is possible to easily cool the rotating electrical machine 20 even without providing a cooler such as an oil cooler for cooling the oil O. Therefore, the number of components of the drive device 100 can be reduced by the absence of the cooler.

According to the present embodiment, the second flow path 50 extends in a rectangular wave shape along the circumferential direction. Therefore, it is possible to widen the part of the housing 10 where the second flow path 50 is provided, and it is possible to more suitably cool the stator 40 by the water W flowing through in the second flow path 50. Due to this, the cooling efficiency by the second flow path 50 can be improved. Therefore, it is possible to further improve the cooling efficiency of the rotating electrical machine 20. In a case where the housing 10 is divided into a plurality of members as in the present embodiment, the second flow path 50 is easily formed by constituting the second flow path 50 using each member constituting the housing 10. Specifically, in the present embodiment, the second flow path 50 can be easily made by providing a hole axially penetrating the first housing member 13 and closing axial both sides of the hole with the second housing member 14 and the third housing member 15.

According to the present embodiment, the flow path cross-sectional area in first flow path portion 54 decreases toward the second flow path portion 55, and the flow path cross-sectional area in the second flow path portion 55 decreases toward the first flow path portion 54. Therefore, the flow speed of the water W flowing toward the second flow path portion 55 in first flow path portion 54 can be increased toward the second flow path portion 55, and the flow speed of the water W flowing toward first flow path portion 54 in the second flow path portion 55 can be increased toward first flow path portion 54. This can relatively increase the flow speed of the water W flowing through in the axial flow path portion 51, and can improve the heat transfer coefficient of the water W flowing through in the axial flow path portion 51. Therefore, the cooling efficiency of the stator 40 by the second flow path 50 can be improved.

The difference between the flow path cross-sectional area at the first end part 54a and the flow path cross-sectional area at the first circumferential flow path portion 52a is equal to or less than the difference between the flow path cross-sectional area at the first end part 54a and the flow path cross-sectional area at the third end part 54b of the first flow path portion 54 on the side close to the second flow path portion 55. The difference between the flow path cross-sectional area at the second end part 55a and the flow path cross-sectional area at the second circumferential flow path portion 52b is equal to or less than the difference between the flow path cross-sectional area at the second end part 55a and the flow path cross-sectional area at the fourth end part 55b of the second flow path portion 55 on the side close to the first flow path portion 54. Therefore, the flow path cross-sectional area at the first end part 54a and the flow path cross-sectional area at the first circumferential flow path portion 52a can be made the same or close to each other. The flow path cross-sectional area at the second end part 55a and the flow path cross-sectional area at the second circumferential flow path portion 52b can be made the same or close to each other. This makes it possible to suppress the flow speed of the water W from decreasing when the water W flows from the axial flow path portion 51 to the first circumferential flow path portion 52a and when the water W flows from the axial flow path portion 51 to the second circumferential flow path portion 52b. Therefore, it is possible to suppress the flow speed of the water W in the first circumferential flow path portion 52a and the second circumferential flow path portion 52b from decreasing, and it is possible to suppress the heat transfer coefficient of the water W in the first circumferential flow path portion 52a and the second circumferential flow path portion 52b from decreasing. Therefore, the cooling efficiency of the stator 40 by the second flow path 50 can be further improved. It is also possible to suppress the water W from staying in a part in the first circumferential flow path portion 52a and a part in the second circumferential flow path portion 52b, and it is also possible to suppress a pressure loss from occurring in the water W flowing through in the first circumferential flow path portion 52a and the second circumferential flow path portion 52b. This makes it possible to efficiently flow the water W in the first circumferential flow path portion 52a and the second circumferential flow path portion 52b. Therefore, the cooling efficiency of the stator 40 by the second flow path 50 can be further improved.

As described above, according to the present embodiment, it is possible to suppress the heat transfer efficiency of the water W from decreasing by suppressing the flow speed of the water W from decreasing in the first circumferential flow path portion 52a and the second circumferential flow path portion 52b where the flow of the water W turns back while improving the heat transfer efficiency of the water W by relatively increasing the flow speed of the water W in the axial flow path portion 51. The pressure loss generated when the flow of the water W turns back can also be reduced. These can improve the cooling efficiency by the second flow path 50.

According to the present embodiment, the flow path cross-sectional area at the first end part 54a and the flow path cross-sectional area at the first circumferential flow path portion 52a are the same, and the flow path cross-sectional area at the second end part 55a and the flow path cross-sectional area at the second circumferential flow path portion 52b are the same. Therefore, when the water W flows from the axial flow path portion 51 to the first circumferential flow path portion 52a and when the water W flows from the axial flow path portion 51 to the second circumferential flow path portion 52b, it is possible to further suppress the flow speed of the water W from decreasing. Therefore, it is possible to further suppress the flow speed of the water W from decreasing in the first circumferential flow path portion 52a and in the second circumferential flow path portion 52b, and it is possible to further suppress the heat transfer coefficient of the water W from decreasing in the first circumferential flow path portion 52a and the second circumferential flow path portion 52b. Therefore, the cooling efficiency of the stator 40 by the second flow path 50 can be further improved.

According to the present embodiment, the circumferential dimension of the first flow path portion 54 decreases toward the second flow path portion 55, and the circumferential dimension of the second flow path portion 55 decreases toward the first flow path portion 54. Therefore, it is possible to reduce the flow path cross-sectional area in the first flow path portion 54 toward the second flow path portion 55 while making the radial dimension of the first flow path portion 54 the same over the entire axial direction. It is possible to reduce the flow path cross-sectional area in the second flow path portion 55 toward the first flow path portion 54 while making the radial dimension of the second flow path portion 55 the same over the entire axial direction. This makes it easy to make the first flow path portion 54 and the second flow path portion 55.

According to the present embodiment, the difference between the circumferential dimension L1 of the first end part 54a and the axial dimension L4 of the first circumferential flow path portion 52a is equal to or less than the difference between the circumferential dimension L1 of the first end part 54a and the circumferential dimension L3 of the third end part 54b. A difference between the circumferential dimension L2 of the second end part 55a and the axial dimension L5 of the second circumferential flow path portion 52b is equal to or less than a difference between the circumferential dimension L2 of the second end part 55a and the circumferential dimension L4 of the fourth end part 55b. Therefore, it is possible to make the flow path cross-sectional area at the first end part 54a and the flow path cross-sectional area in the first circumferential flow path portion 52a the same or close to each other while making the radial dimension of the first end part 54a and the radial dimension of the first circumferential flow path portion 52a the same. It is possible to make the flow path cross-sectional area at the second end part 55a and the flow path cross-sectional area in the second circumferential flow path portion 52b the same or close to each other while making the radial dimension at the second end part 55a and the radial dimension in the second circumferential flow path portion 52b the same. This makes it easy to make the axial flow path portion 51, the first circumferential flow path portion 52a, and the second circumferential flow path portion 52b.

According to the present embodiment, the third end part 54b and the fourth end part 55b are joined to each other at the axial center part of the axial flow path portion 51. Therefore, the flow speed of the water W can be easily maximized at the axial center part of the axial flow path portion 51. This makes it easy to reduce the deviation in the flow speed of the water W in the axial flow path portion 51, and easy to relatively increase the flow speed of the water W in the axial flow path portion 51 over the entire axial direction. Therefore, the cooling efficiency by the second flow path 50 can be further improved.

According to the present embodiment, the corner portions 52f and 52g where the first circumferential flow path portion 52a and the axial flow path portion 51 are joined and the corner portions 52h and 52i where the second circumferential flow path portion 52b and the axial flow path portion 51 are joined have arc shapes. Therefore, when the water W flows from one of the first circumferential flow path portion 52a and the axial flow path portion 51 to the other via the corner portions 52f and 52g, the water W easily flows smoothly, and the pressure loss can be suppressed from occurring in the water W. This makes it possible to more efficiently flow the water W from one of the first circumferential flow path portion 52a and the axial flow path portion 51 to the other. When the water W flows from one of the second circumferential flow path portion 52b and the axial flow path portion 51 to the other via the corner portions 52h and 52i, the water W easily flows smoothly, and the pressure loss can be suppressed from occurring in the water W. This makes it possible to more efficiently flow the water W from one of the second circumferential flow path portion 52b and the axial flow path portion 51 to the other. Therefore, the cooling efficiency by the second flow path 50 can be further improved.

According to the present embodiment, the surface positioned outside among the inner surfaces of the corner portions 52f and 52g has an arc shape in which the radius of curvature becomes equal to or more than half of the circumferential dimension L1 of the first end part 54a as viewed in the radial direction. Therefore, when the water W flows from one of the first circumferential flow path portion 52a and the axial flow path portion 51 to the other via the corner portions 52f and 52g, the water W easily flows more smoothly, and the pressure loss can be further suppressed from occurring in the water W. This makes it possible to more efficiently flow the water W from one of the first circumferential flow path portion 52a and the axial flow path portion 51 to the other. According to the present embodiment, the surface positioned outside among the inner surfaces of the corner portions 52h and 52i has an arc shape in which the radius of curvature becomes equal to or more than half of the circumferential dimension L2 of the second end part 55a as viewed in the radial direction. When the water W flows from one of the second circumferential flow path portion 52b and the axial flow path portion 51 to the other via the corner portions 52h and 52i, the water W easily flows smoothly, and the pressure loss can be suppressed from occurring in the water W. This makes it possible to more efficiently flow the water W from one of the second circumferential flow path portion 52b and the axial flow path portion 51 to the other. Therefore, the cooling efficiency by the second flow path 50 can be further improved.

According to the present embodiment, the axial flow path portion 51 is provided in the first housing member 13. At least a part of the first circumferential flow path portion 52a is provided in the third housing member 15. At least a part of the second circumferential flow path portion 52b is provided in the second housing member 14. Therefore, the axial flow path portion 51 can be configured by at least a part of a hole axially penetrating the first housing member 13. Due to this, for example, when the first housing member 13 is made by metallic mold casting such as die casting, the first flow path portion 54 and the second flow path portion 55 can be molded by a part of each of the pair of molds combined in the axial direction. Therefore, the first flow path portion 54 and the second flow path portion 55 can be easily made. The first flow path portion 54 and the second flow path portion 55 each have a flow path cross-sectional area that increases as away from the other flow path portion in the axial direction. Therefore, the shape of each of the flow path portions can be easily formed into a shape having a draft angle, and a part of the mold for making the first flow path portion 54 and a part of the mold for making the second flow path portion 55 can be easily removed in the axial direction. Due to this, the axial flow path portion 51 having the first flow path portion 54 and the second flow path portion 55 can be more easily made by metallic mold casting such as die casting.

According to the present embodiment, the first circumferential flow path portion 52a is provided across the first housing member 13 and the third housing member 15. Therefore, for example, as compared with a case where the entire first circumferential flow path portion 52a is provided in the third housing member 15, it is possible to suppress the third housing member 15 from increasing in size in the axial direction. This makes it possible to suppress the drive device 100 from increasing in size in the axial direction. Since the second flow path 50 can be suitably extended to axial one side relative to the stator 40, the range of the stator 40 that can be cooled by the second flow path 50 can be widened. Due to this, the rotating electrical machine 20 can be more suitably cooled by the water W flowing through in the second flow path 50.

According to the present embodiment, the collection flow path 93 includes the groove portion 93a provided on the inner peripheral face of the motor housing 11 and extending in the axial direction, the collection flow path body portion 93c positioned radially outside relative to the groove portion 93a, extending in the axial direction, and joined to the inside of the transmission mechanism housing 12, and the connection portion 93b joining the groove portion 93a and the collection flow path body portion 93c. Therefore, at least part of the oil O supplied into the motor housing 11 by the first supply flow path 91 and the second supply flow path 92 can be caused to flow into the collection flow path 93 from the groove portion 93a. The oil O having flowed into the groove portion 93a can be sent into the transmission mechanism housing 12 via the connection portion 93b and the collection flow path body portion 93c. Due to this, the oil O in the motor housing 11 can be easily returned into the transmission mechanism housing 12 by the collection flow path 93. According to the present embodiment, at least a part of the collection flow path body portion 93c is positioned radially outside the second flow path 50. Therefore, the oil O flowing through in the collection flow path body portion 93c can be easily cooled by the water W flowing through in the second flow path 50.

According to the present embodiment, the connection portion 93b joins the end part on the axial other side of the groove portion 93a and the end part on the axial other side of the collection flow path body portion 93c. That is, the position where the groove portion 93a and the collection flow path body portion 93c are joined by the connection portion 93b can be set to a position relatively distant from the transmission mechanism housing 12 in the axial direction. Therefore, it is possible to increase the distance by which the oil O flows from the connection portion 93b into the collection flow path body portion 93c before reaching the inside of the transmission mechanism housing 12. This makes it possible to extend the time during which the oil O flowing through in the collection flow path body portion 93c can be cooled by the water W flowing through in the second flow path 50. Therefore, the oil O flowing through in the collection flow path body portion 93c can be suitably cooled by the water W flowing through in the second flow path 50. Therefore, the lower temperature oil O can be easily supplied to the rotating electrical machine 20. Due to this, the cooling efficiency of the rotating electrical machine 20 can be further improved.

According to the present embodiment, the plurality of first circumferential flow path portions 52a include the first circumferential flow path portion 52c circumferentially straddling axial one side of the groove portion 93a. The connection portion 93b is positioned between the second circumferential flow path portions 52b circumferentially adjacent to each other. In this manner, the first circumferential flow path portion 52c straddles the groove portion 93a on the side opposite to the side where the connection portion 93b is provided in the axial direction, so that the connection portion 93b can be extended from the radially inside relative to the second flow path 50 to the radially outside relative to the second flow path 50 without interfering with the second flow path 50. Due to this, at least a part of the collection flow path body portion 93c can be arranged radially outside the second flow path 50 without interfering with the second flow path 50.

According to the present embodiment, the second supply flow path 92 has the introduction flow path portion 92a extending in the axial direction from the inside of the transmission mechanism housing 12. At least a part of the introduction flow path portion 92a is positioned radially outside the second flow path 50. Therefore, the introduction flow path portion 92a can be arranged close to the second flow path 50. Due to this, the oil O passing through the introduction flow path portion 92a can be easily cooled by the water W flowing through in the second flow path 50. Therefore, the temperature of the oil O supplied to the inside of the motor housing 11 by the second supply flow path 92 can be made relatively low. Therefore, the part of the rotating electrical machine 20 accommodated in the motor housing 11 can be more suitably cooled by the oil O. Therefore, it is possible to further improve the cooling efficiency of the rotating electrical machine 20.

According to the present embodiment, the introduction flow path portion 92a is arranged circumferentially adjacent to the collection flow path 93. Therefore, the introduction flow path portion 92a and the collection flow path 93 can be collectively arranged. This can suppress complication of the structure of the housing 10.

According to the present embodiment, the collection flow path 93 and the second flow path 50 are provided across the first housing member 13 and the second housing member 14, respectively. Therefore, the collection flow path 93 and the second flow path 50 can each be enlarged in the axial direction. This makes it easy to increase the number of parts of the collection flow path 93 arranged close to the second flow path 50. Therefore, the oil O flowing through in the collection flow path 93 can be more easily cooled by the water W flowing through in the second flow path 50. Since the second flow path 50 can be enlarged in the axial direction, the range of the rotating electrical machine 20 that can be cooled by the water W flowing through in the second flow path 50 can be widened in the axial direction. Due to this, the entire stator core 41 and the coil ends 42a and 42b protruding from the stator core 41 to axial both sides can be easily cooled by the water W flowing through in the second flow path 50. As described above, the cooling efficiency of the rotating electrical machine 20 can be further improved.

According to the present embodiment, the first housing member 13 and the second housing member 14 are fixed to each other at positions radially inside the collection flow path 93 and circumferentially adjacent to the second flow path 50. In the present embodiment, the first housing member 13 and the second housing member 14 are fixed to each other at the positions by the bolt 10d tightened into the female screw hole 13i. Due to this, the first housing member 13 and the second housing member 14 can be fixed at positions close to both the collection flow path 93 and the second flow path 50. Therefore, it is possible to suppress parts of the first housing member 13 and the second housing member 14 constituting the collection flow path 93 from being separated from each other. It is possible to suppress parts of the first housing member 13 and the second housing member 14 constituting the second flow paths 50 from being separated from each other. This can suppress the oil O from leaking from the collection flow path 93 and the water W from leaking from the second flow path 50. It is possible to suppress the oil O leaking from the collection flow path 93 from entering the second flow path 50 and being mixed with the water W. It is possible to suppress the water W leaking from the second flow path 50 from entering the collection flow path 93 and being mixed with the oil O.

According to the present embodiment, the division wall portion 19 has the through hole 19a joining the inside of the motor housing 11 and the inside of the transmission mechanism housing 12. Therefore, the oil O supplied into the motor housing 11 can be returned into the transmission mechanism housing 12 from the through hole 19a in addition to the collection flow path 93. Due to this, the amount of the oil O returned from the motor housing 11 into the transmission mechanism housing 12 can be increased.

For example, when the housing 10 is configured by two separate members constituting the motor housing 11 and two separate members constituting the transmission mechanism housing 12 as in the present embodiment, the motor housing 11 and the transmission mechanism housing 12 are provided in a divided manner. In such a case, the motor housing 11 and the transmission mechanism housing 12 are conventionally provided with structures for lubricating the bearings separately. Therefore, there has been a problem that the manufacturing cost of the drive device 100 increases due to a complicated structure of the housing 10 or use of a relatively expensive bearing requiring no supply of lubricating oil. The relatively expensive bearing requiring no supply of lubricating oil is, for example, a bearing provided with semi-solid grease.

On the other hand, according to the present embodiment, the housing 10 has the oil supply path 95 extending axially through the second facing wall portion 15a from the inside of the transmission mechanism housing 12. The oil supply path 95 has the supply port 13h for supplying the oil O to the bearing 72 held by the first facing wall portion 13a of the motor housing 11. The supply port 13h is positioned on the upper side relative to the central axis J1. Therefore, the oil O discharged from the supply port 13h can be dropped by gravity and supplied to the bearing 72 provided in the motor housing 11 among the bearings supporting the rotor 30 rotatable about the central axis J1. That is, part of the oil O in the transmission mechanism housing 12 can be supplied to the bearing 72 provided in the motor housing 11 by the oil supply path 95. In this manner, the bearing 72 provided in the motor housing 11 can be lubricated using the bearing lubrication structure provided in the transmission mechanism housing 12. That is, in the drive device 100, the bearing 72 provided in the motor housing 11 can be lubricated using the oil O in the transmission mechanism housing 12 while the motor housing 11 and the transmission mechanism housing 12 are configured to be separable. Therefore, it is possible to suppress complication of the structure of the housing 10, and it is not necessary to use a bearing requiring no supply of lubricating oil as the bearing 72. Therefore, it is possible to suppress manufacturing cost of the drive device 100 from increasing.

According to the present embodiment, the bearing holding portion 13c is provided on the surface on the axial other side of the first facing wall portion 13a. The oil supply path 95 axially penetrates the first facing wall portion 13a and extends to the inside of the motor housing 11. The supply port 13h is open to the inside of the motor housing 11. Therefore, even when the bearing 72 held by the bearing holding portion 13c is positioned inside the motor housing 11, the oil O can be supplied to the bearing 72 by the oil supply path 95.

According to the present embodiment, the bearing holding portion 13c has the penetration portion 13f radially penetrating the bearing holding portion 13c. The supply port 13h is open to the inside of the penetration portion 13f. Therefore, the oil O discharged from the supply port 13h is easily supplied from the penetration portion 13f to the inside of the bearing holding portion 13c. Due to this, the oil O can be more easily supplied to the bearing 72.

According to the present embodiment, the oil supply path 95 includes the first hole part 13g axially penetrating the first facing wall portion 13a, the second hole part 15g axially penetrating the second facing wall portion 15a, and the first gutter portion 17 positioned axially between the first facing wall portion 13a and the second facing wall portion 15a and joining the first facing wall portion 13a and the second facing wall portion 15a. The first gutter portion 17 is joined to a part positioned on the lower side of the first hole part 13g of the surface on axial one side of the first facing wall portion 13a and a part positioned on the lower side of the second hole part 15g of the surface on the axial other side of the second facing wall portion 15a. Therefore, the oil O in the transmission mechanism housing 12 can be supplied into the motor housing 11 through the second hole part 15g, the first gutter portion 17, and the first hole part 13g in this order. Due to this, the oil O in the transmission mechanism housing 12 can be more suitably supplied to the bearing 72 in the motor housing 11.

According to the present embodiment, the oil supply path 95 includes the second gutter portion 18 positioned inside the transmission mechanism housing 12. The second gutter portion 18 is joined to the part positioned downward the second hole part 15g in the surface on axial one side of the second facing wall portion 15a. Therefore, for example, part of the oil O scattered in the transmission mechanism housing 12 by being brought up by the ring gear 62a can be received by the second gutter portion 18. At least part of the oil O received by the second gutter portion 18 can flow into the second hole part 15g. Due to this, the oil O in the transmission mechanism housing 12 can be more suitably supplied to the bearing 72 in the motor housing 11 through the second hole part 15g, the first gutter portion 17, and the first hole part 13g in this order.

According to the present embodiment, the second facing wall portion 15a has the through hole 15h joining the space S positioned axially between the first facing wall portion 13a and the second facing wall portion 15a and the inside of the transmission mechanism housing 12. Therefore, the oil O leaking from the inside of the first gutter portion 17, for example, can be returned into the transmission mechanism housing 12 through the through hole 15h. Due to this, the oil O can be suppressed from accumulating in the space S.

According to the present embodiment, the first facing wall portion 13a has the through hole 13e joining the space S positioned axially between the first facing wall portion 13a and the second facing wall portion 15a and the inside of the motor housing 11. Therefore, the inside of the motor housing 11 and the inside of the transmission mechanism housing 12 can be joined by the through hole 13e, the space S, and the through hole 15h. Due to this, the above-described through hole 19a is formed, and at least part of the oil O supplied into the motor housing 11 can be returned into the transmission mechanism housing 12.

The present invention is not limited to the above-described embodiment, and other configurations and other methods can be employed within the scope of the technical idea of the present invention. The first flow path may have any configuration as long as it includes the supply flow path and the collection flow path. In the above-described embodiment, the first supply flow path 91 and the second supply flow path 92 are provided as the supply flow path, but the present invention is not limited to this. As the supply flow path, only any one of the first supply flow path 91 and the second supply flow path 92 may be provided.

The collection flow path extending from the inside of the motor housing to the inside of the transmission mechanism housing may have any configuration as long as at least a part thereof is positioned radially outside the second flow path. When the motor housing has the first housing member and the second housing member, the collection flow path may be provided only in the first housing member in the motor housing. The shape and size of the groove portion, the shape and size of the connection portion, and the shape and size of the collection flow path body portion are not particularly limited. The groove portion and the connection portion need not be provided.

The second flow path extending in a rectangular wave shape along the circumferential direction may have any other parts as long as it has the axial flow path portion, the first circumferential flow path portion, and the second circumferential flow path portion. The axial flow path portion may have any other portion as long as it has the first flow path portion and the second flow path portion. The axial flow path portion may have a third flow path portion joining the first flow path portion and the second flow path portion axially between the first flow path portion and the second flow path portion. The first flow path portion and the second flow path portion may be joined at any position in the axial direction of the axial flow path portion. The flow path cross-sectional area in the first flow path portion may change in any manner as long as it decreases toward the second flow path portion. The circumferential dimension of the first flow path portion may be the same over the entire axial direction. In this case, for example, the radial dimension of the first flow path portion decreases toward the second flow path portion. The flow path cross-sectional area in the second flow path portion may change in any manner as long as it decreases toward the first flow path portion. The circumferential dimension of the second flow path portion may be the same over the entire axial direction. In this case, for example, the radial dimension of the second flow path portion decreases toward the first flow path portion.

The flow path cross-sectional area at the first end part and the flow path cross-sectional area at the first circumferential flow path portion may be different from each other. The flow path cross-sectional area at the first end part may be smaller or larger than the flow path cross-sectional area at the first circumferential flow path portion. The flow path cross-sectional area at the second end part and the flow path cross-sectional area at the second circumferential flow path portion may be different from each other. The flow path cross-sectional area at the second end part may be smaller or larger than the flow path cross-sectional area at the second circumferential flow path portion.

The first circumferential flow path portion needs not be provided across the first housing member and the third housing member. The second circumferential flow path portion needs not be provided across the first housing member and the second housing member. The entire first circumferential flow path portion may be provided in the third housing member. The entire second circumferential flow path portion may be provided in the second housing member. The entire axial flow path portion, the entire first circumferential flow path portion, and the entire second circumferential flow path portion may be provided in the same single member. The number of the axial flow path portions is not particularly limited as long as it is three or more. The number of the first circumferential flow path portions and the number of the second circumferential flow path portions are not particularly limited. Three axial flow path portions may be provided, and one first circumferential flow path portion and one second circumferential flow path portion may be provided. The corner portion where the first circumferential flow path portion and the axial flow path portion are joined and the corner portion where the second circumferential flow path portion and the axial flow path portion are joined may have any shape.

The type of the first fluid flowing through in the first flow path and the type of the second fluid flowing through in the second flow path are not particularly limited. The first fluid and the second fluid may be the same type of fluid. The first fluid may be an insulating liquid or water. When the first fluid is water, the surface of the stator may be subjected to an insulation treatment. The second fluid may be oil.

The oil supply path extending from the inside of the transmission mechanism housing axially through the second facing wall portion may have any configuration as long as the oil supply passage has a supply port positioned on the upper side relative to the central axis and through which oil is supplied to the bearing. When the bearing holding portion provided on the first facing wall portion of the motor housing is provided on the surface on axial one side of the first facing wall portion, i.e., the surface of the first facing wall portion facing the transmission mechanism housing side, the oil supply path may penetrate only the second facing wall portion and needs not penetrate the first facing wall portion. In this case, for example, the supply port of the oil supply path is open to the space between the first facing wall portion and the second facing wall portion. The oil supply path needs not have at least one of the first hole part, the second hole part, the first gutter portion, and the second gutter portion. The oil supply path may be formed of, for example, a tubular member such as a pipe. The oil supply path needs not be provided.

The number of housing members constituting the housing is not particularly limited. The housing may be configured by fixing two housing members to each other, fixing three housing members to one another, or fixing five or more housing members to one another. The housing member constituting the housing may include a housing member having a part of the motor housing and a part of the transmission mechanism housing.

The purpose of the rotating electrical machine and the purpose of the drive device applied with the present invention are not particularly limited. For example, the drive device may be mounted in a vehicle for a purpose other than the purpose of rotating the axle, or may be mounted on equipment other than the vehicle. The attitude when the rotating electrical machine and the drive device are used is not particularly limited. The central axis of the rotating electrical machine may be inclined with respect to the horizontal direction orthogonal to the vertical direction or may extend in the vertical direction. The rotating electrical machine may be mounted on equipment other than the drive device. The rotating electrical machine is not limited to a motor, and may be a power generator. The configurations described above in the present description may be appropriately combined in a range where no conflict arises.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A rotating electrical machine comprising:
   a rotor rotatable about a central axis;
   a stator facing the rotor across a gap; and
   a housing internally accommodating the rotor and the stator, wherein
   the housing has a flow path extending in a rectangular wave shape along a circumferential direction,
   the flow path includes
      a plurality of axial flow path portions extending in an axial direction and arranged at intervals in the circumferential direction,
      a first circumferential flow path portion joining first end parts on an axial one side of the axial flow path portions circumferentially adjacent to each other, and
      a second circumferential flow path portion joining second end parts on an axial other side of the axial flow path portions circumferentially adjacent to each other,
   the axial flow path portion includes
      a first flow path portion having the first end part, and
      a second flow path portion having the second end part and joined to an axial other side of the first flow path portion,
   a flow path cross-sectional area in the first flow path portion decreases toward the second flow path portion,
   a flow path cross-sectional area in the second flow path portion decreases toward the first flow path portion,
   a difference between a flow path cross-sectional area at the first end part and a flow path cross-sectional area at the first circumferential flow path portion is equal to or less than a difference between the flow path cross-sectional area at the first end part and a flow path cross-sectional area at a third end part of the first flow path portion, the third end part being on a side close to the second flow path portion, and
   a difference between a flow path cross-sectional area at the second end part and a flow path cross-sectional area at the second circumferential flow path portion is equal to or less than a difference between the flow path cross-sectional area at the second end part and a flow path cross-sectional area at a fourth end part of the second flow path portion, the fourth end part being on a side close to the first flow path portion.

2. The rotating electrical machine according to claim 1, wherein
   the flow path cross-sectional area at the first end part and the flow path cross-sectional area at the first circumferential flow path portion are same, and
   the flow path cross-sectional area at the second end part and the flow path cross-sectional area at the second circumferential flow path portion are same.

3. The rotating electrical machine according to claim 1, wherein
   a circumferential dimension of the first flow path portion decreases toward the second flow path portion, and
   a circumferential dimension of the second flow path portion decreases toward the first flow path portion.

4. The rotating electrical machine according to claim 3, wherein
   a difference between a circumferential dimension of the first end part and an axial dimension of the first circumferential flow path portion is equal to or less than a difference between the circumferential dimension of the first end part and a circumferential dimension at the third end part, and
   a difference between a circumferential dimension of the second end part and an axial dimension of the second circumferential flow path portion is equal to or less than a difference between a circumferential dimension of the second end part and a circumferential dimension at the fourth end part.

5. The rotating electrical machine according to claim 1, wherein the third end part and the fourth end part are joined to each other at an axial center part of the axial flow path portion.

6. The rotating electrical machine according to claim 1, wherein a corner portion where the first circumferential flow path portion and the axial flow path portion are joined and a corner portion where the second circumferential flow path portion and the axial flow path portion are joined have an arc shape.

7. The rotating electrical machine according to claim 1, wherein
   the housing includes
      a first housing member in a tubular shape surrounding the stator,
      a second housing member fixed to axial other side of the first housing member, and
      a third housing member fixed to axial one side of the first housing member, the axial flow path portion is provided in the first housing member,
   at least a part of the first circumferential flow path portion is provided in the third housing member, and
   at least a part of the second circumferential flow path portion is provided in the second housing member.

8. A drive device mounted on a vehicle, the drive device comprising:
   the rotating electrical machine according to claim 1; and
   a transmission mechanism connected to the rotor and transmitting rotation of the rotor to an axle of the vehicle.

* * * * *